US012598051B2

(12) United States Patent
Li et al.

(10) Patent No.: US 12,598,051 B2
(45) Date of Patent: Apr. 7, 2026

(54) TRANSMISSION DIRECTION DETERMINING METHOD AND APPARATUS, TERMINAL, AND NETWORK SIDE DEVICE

(71) Applicant: VIVO MOBILE COMMUNICATION CO., LTD., Guangdong (CN)

(72) Inventors: Na Li, Guangdong (CN); Xueming Pan, Guangdong (CN); Xiaodong Shen, Guangdong (CN); Gen Li, Guangdong (CN); Kai Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 284 days.

(21) Appl. No.: 18/478,999

(22) Filed: Sep. 30, 2023

(65) Prior Publication Data

US 2024/0031119 A1     Jan. 25, 2024

Related U.S. Application Data

(63) Continuation of application No. PCT/CN2022/082780, filed on Mar. 24, 2022.

(30) Foreign Application Priority Data

Mar. 31, 2021   (CN) .......................... 202110350934.8

(51) Int. Cl.
*H04L 5/18*       (2006.01)

(52) U.S. Cl.
CPC ...................................... *H04L 5/18* (2013.01)

(58) Field of Classification Search
CPC ....... H04L 5/18; H04L 5/0094; H04L 5/1469; H04W 72/0446; H04W 72/046
See application file for complete search history.

(56) References Cited

U.S. PATENT DOCUMENTS

2015/0117294 A1   4/2015   Li et al.
2019/0068334 A1   2/2019   Stern-Berkowitz et al.
(Continued)

FOREIGN PATENT DOCUMENTS

CN     103378963 A    10/2013
CN     109474381 A    3/2019
(Continued)

OTHER PUBLICATIONS

Extended European Search Report for Application No. 22778737.1, dated Sep. 10, 2024, 12 Pages.
Qualcomm Incorporated "Resource management for enhanced duplexing" 3GPP TSG RAN WGI Meeting #104-e, Jan. 2021, R1-2101483, 8 Pages.
(Continued)

*Primary Examiner* — Nizam U Ahmed
(74) *Attorney, Agent, or Firm* — Foley & Lardner LLP

(57)          ABSTRACT

A transmission direction determining method and apparatus, a terminal, and a network side device, which belong to the field of communication technologies. According to embodiments of this application, the transmission direction determining method includes: The terminal determines a transmission direction corresponding to a time unit based on first indication signaling. The transmission direction includes an uplink transmission direction, a downlink transmission direction, or a flexible transmission direction. The flexible transmission direction is capable of being indicated as at least one of the following: an uplink transmission direction; a downlink transmission direction; and a flexible direction not for receiving and sending.

18 Claims, 5 Drawing Sheets

(56) References Cited

U.S. PATENT DOCUMENTS

| | | | |
|---|---|---|---|
| 2020/0008187 A1 | 1/2020 | Zhang et al. | |
| 2020/0120514 A1* | 4/2020 | Wang ................... | H04L 5/0053 |
| 2020/0275439 A1 | 8/2020 | Xue et al. | |
| 2021/0051672 A1 | 2/2021 | Rastegardoost et al. | |
| 2022/0007405 A1 | 1/2022 | Takeda et al. | |
| 2022/0030591 A1 | 1/2022 | Takeda et al. | |
| 2022/0053554 A1 | 2/2022 | Chen et al. | |
| 2022/0264598 A1 | 8/2022 | Xu et al. | |

FOREIGN PATENT DOCUMENTS

| | | |
|---|---|---|
| CN | 110876201 A | 3/2020 |
| CN | 111615209 A | 9/2020 |
| CN | 111801918 A | 10/2020 |
| JP | 2020515147 A | 5/2020 |
| WO | 2020029219 A1 | 2/2020 |
| WO | 2020100787 A1 | 5/2020 |
| WO | 2020105180 A1 | 5/2020 |
| WO | 2021022568 A1 | 2/2021 |

OTHER PUBLICATIONS

First Office Action for Japanese Application No. 2023-558643, dated Sep. 30, 2024, 5 Pages.

Nokia, Nokia Shanghai Bell "Half-duplex operation in CA based on [95-NR-06]" 3GPP TSG-RAN WG1 Meeting #99, Reno, Nevada, U.S.A, Nov. 2019, R1-1912282, 5 Pages.

International Search Report and Written Opinion for Application No. PCT /CN2022/082780, dated Jun. 2, 2022, 10 Pages.

Ericsson "DL/UL common aspects of TDD for NB IoT" 3GPP TSG RAN WG1 Meeting #91, Reno Nevada, USA, Nov. 2017, R1-1719363, 11 Pages.

Intel Corporation "Discussion on SPS configuration for TDD eIMTA" 3GPP TSG RAN WG2 Meeting #85bis, Valencia, Spain, Apr. 2014, R2-141229, 4 Pages.

LG Electronics "New SI proposal: Study on flexible and full duplex for NR" 3GPP TSG RAN Meeting #78, Lisbon, Portugal, Dec. 2017, RP-172737, 5 Pages.

CN Office Action on CN Appl. No. 202110350934.8 dated Dec. 8, 2025 (17 pages).

* cited by examiner

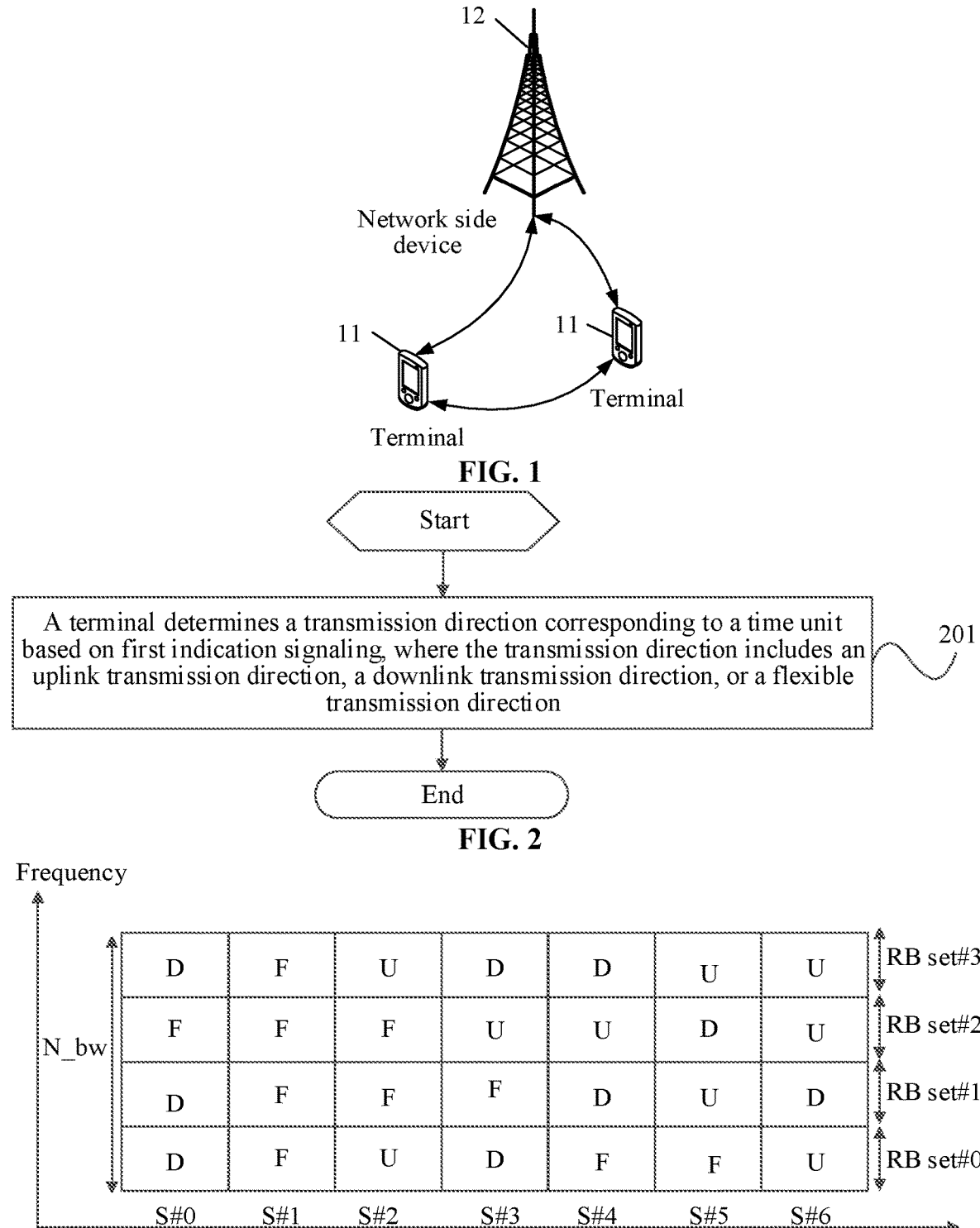

12

Network side
device 11                    11

Terminal

Terminal

FIG. 1

Start

A terminal determines a transmission direction corresponding to a time unit
based on first indication signaling, where the transmission direction includes an
uplink transmission direction, a downlink transmission direction, or a flexible
transmission direction

201

End

FIG. 2

Frequency

N_bw

| D | F | U | D | D | U | U | RB set#3 |
| F | F | F | U | U | D | U | RB set#2 |
| D | F | F | F | D | U | D | RB set#1 |
| D | F | U | D | F | F | U | RB set#0 |

S#0   S#1   S#2   S#3   S#4   S#5   S#6

Time

FIG. 3

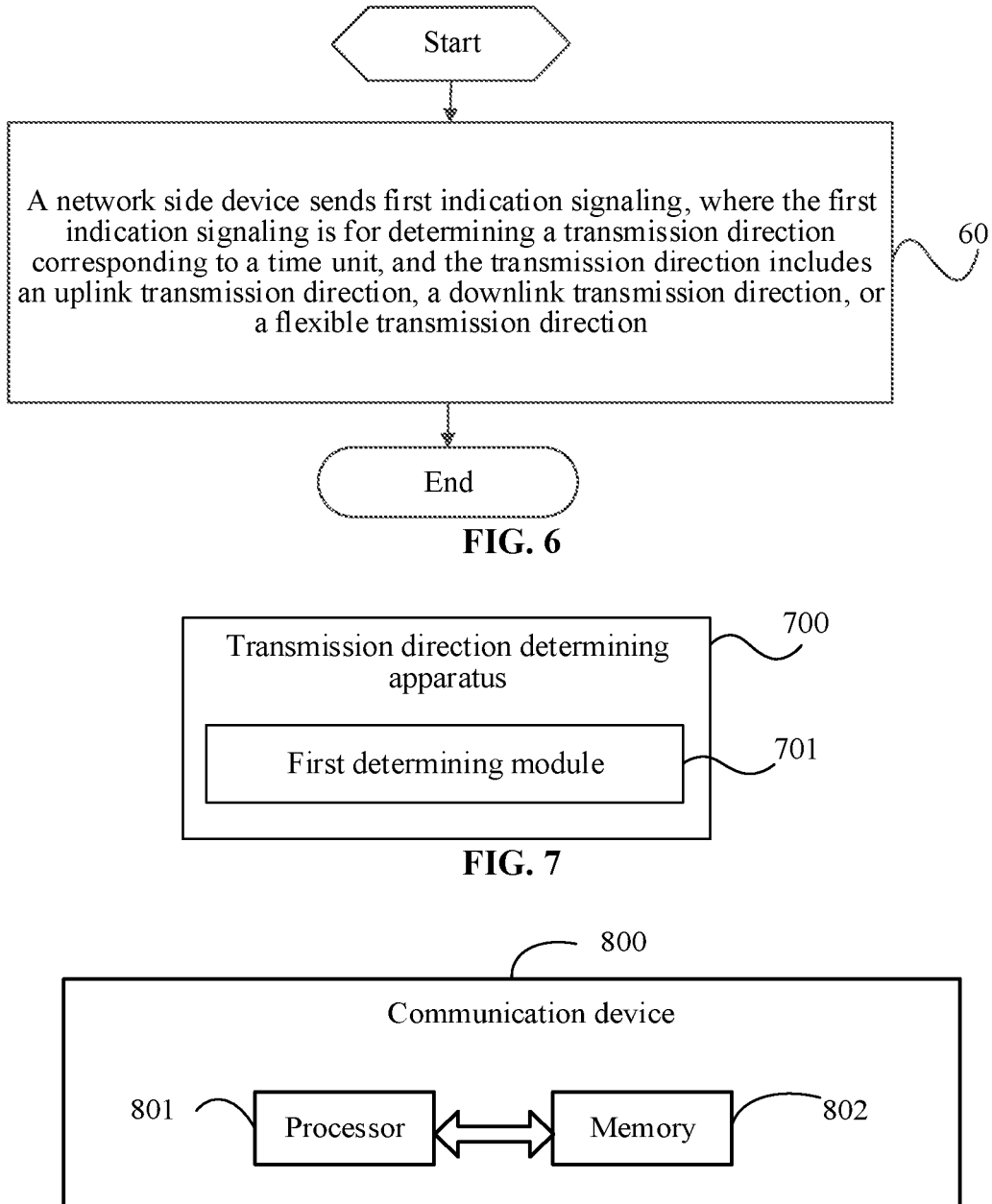

Start

A network side device sends first indication signaling, where the first indication signaling is for determining a transmission direction corresponding to a time unit, and the transmission direction includes an uplink transmission direction, a downlink transmission direction, or a flexible transmission direction          601

End

FIG. 6

Transmission direction determining apparatus          700

First determining module          701

Communication device

801          Processor ⟷ Memory          802

FIG. 8

TRANSMISSION DIRECTION DETERMINING METHOD AND APPARATUS, TERMINAL, AND NETWORK SIDE DEVICE

CROSS-REFERENCE TO RELATED APPLICATIONS

This application is a continuation of PCT Application No. PCT/CN2022/082780 filed on Mar. 24, 2022, which claims priority to Chinese Patent Application No. 202110350934.8, filed on Mar. 31, 2021, which are incorporated herein by reference in their entireties.

TECHNICAL FIELD

The present invention relates to the field of communication technologies, and in particular, to a transmission direction determining method and apparatus, a terminal, and a network side device.

BACKGROUND

In a network system for flexible/full duplex, at a same moment, a terminal without a full duplex capability can perform only sending or receiving, while a network side can perform receiving and sending simultaneously. Therefore, different terminals may perform sending and receiving by using different frequency resources at a same moment. Correspondingly, a network is required for providing signaling for the terminals to configure and/or indicate transmission directions: downlink D, uplink U, and flexible F, of the different frequency resources.

To coexist with an adjacent channel and reduce interference in the adjacent channel; and to efficiently coexist, in a same network, with a conventional terminal (legacy UE, or referred to as UE of a version before Rel-18) and another terminal having different requirements on a service, different frequency resources of a same time unit may be indicated as uplink, downlink, or flexible, but the terminal without the full duplex capability cannot determine a transmission direction of the time unit, so that downlink processing or uplink processing cannot be performed correspondingly.

SUMMARY

According to a first aspect, a transmission direction determining method is provided, including:

determining, by a terminal, a transmission direction corresponding to a time unit based on first indication signaling, where the transmission direction includes an uplink transmission direction, a downlink transmission direction, or a flexible transmission direction; and
the flexible transmission direction is capable of being indicated as at least one of the following:
an uplink transmission direction;
a downlink transmission direction; and
a flexible direction not for receiving and sending.

According to a second aspect, a transmission direction determining method is provided, including:

sending, by a network side device, first indication signaling, where the first indication signaling is for determining a transmission direction corresponding to a time unit, where the transmission direction includes an uplink transmission direction, a downlink transmission direction, or a flexible transmission direction; and the flexible transmission direction is capable of being indicated as at least one of the following:
an uplink transmission direction;
a downlink transmission direction; and
a flexible direction not for receiving and sending.

According to a third aspect, a transmission direction determining apparatus is provided, including:

a first determining module, configured to determine a transmission direction corresponding to a time unit based on first indication signaling, where the transmission direction includes an uplink transmission direction, a downlink transmission direction, or a flexible transmission direction; and
the flexible transmission direction is capable of being indicated as at least one of the following:
an uplink transmission direction;
a downlink transmission direction; and
a flexible direction not for receiving and sending.

According to a fourth aspect, a transmission direction determining apparatus is provided, including:

a first transmission module, configured to send first indication signaling, where the first indication signaling is for determining a transmission direction corresponding to a time unit, where the transmission direction includes an uplink transmission direction, a downlink transmission direction, or a flexible transmission direction; and
the flexible transmission direction is capable of being indicated as at least one of the following:
an uplink transmission direction;
a downlink transmission direction; and
a flexible direction not for receiving and sending.

According to a fifth aspect, a terminal is provided, including a processor, a memory, and a program or instructions stored in the memory and runnable on the processor, where when the program or the instructions are executed by the processor, the steps of the method according to the first aspect are implemented.

According to a sixth aspect, a terminal is provided, including a processor and a communication interface, where the processor is configured to determine a transmission direction corresponding to a time unit based on first indication signaling, where the transmission direction includes an uplink transmission direction, a downlink transmission direction, or a flexible transmission direction; and
the flexible transmission direction is capable of being indicated as at least one of the following:
an uplink transmission direction;
a downlink transmission direction; and
a flexible direction not for receiving and sending.

According to a seventh aspect, a network side device is provided, where the network side device includes a processor, a memory, and a program or instructions stored in the memory and runnable on the processor, and when the program or the instructions are executed by the processor, the steps of the method according to the second aspect are implemented.

According to an eighth aspect, a network side device is provided, including a processor and a communication interface, where the communication interface is configured to send first indication signaling, where the first indication signaling is for determining a transmission direction corresponding to a time unit, where the transmission direction includes an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending.

According to a ninth aspect, a readable storage medium is provided, where the readable storage medium stores a program or instructions, and when the program or instructions are executed by a processor, the steps of the method according to the first aspect, or the steps of the method according to the second aspect are implemented.

According to a tenth aspect, a chip is provided, where the chip includes a processor and a communication interface, the communication interface is coupled to the processor, and the processor is configured to run a program or instructions to implement the method according to the first aspect, or implement the method according to the second aspect.

According to an eleventh aspect, a computer program/program product is provided, where the computer program/program product is stored in a non-volatile storage medium, and the program/program product is executed by at least one processor to implement the steps of the transmission direction determining method according to the first aspect, or implement the steps of the transmission direction determining method according to the second aspect.

According to a twelfth aspect, a communication device is provided, configured to perform the method according to the first aspect, or perform the method according to the second aspect.

BRIEF DESCRIPTION OF THE DRAWINGS

FIG. 1 represents a structural diagram of a communication system to which the embodiments of this application are applicable;

FIG. 2 represents a first schematic flowchart of a transmission direction determining method according to an embodiment of this application;

FIG. 3 represents a first schematic configuration diagram of a transmission direction of a frequency domain unit according to an embodiment of this application;

FIG. 6 represents a second schematic flowchart of a transmission direction determining method according to an embodiment of this application;

FIG. 7 represents a first schematic diagram of a module of a transmission direction determining apparatus according to an embodiment of this application;

FIG. 8 represents a structural block diagram of a communication device according to an embodiment of this application;

DETAILED DESCRIPTION

Figure 4:
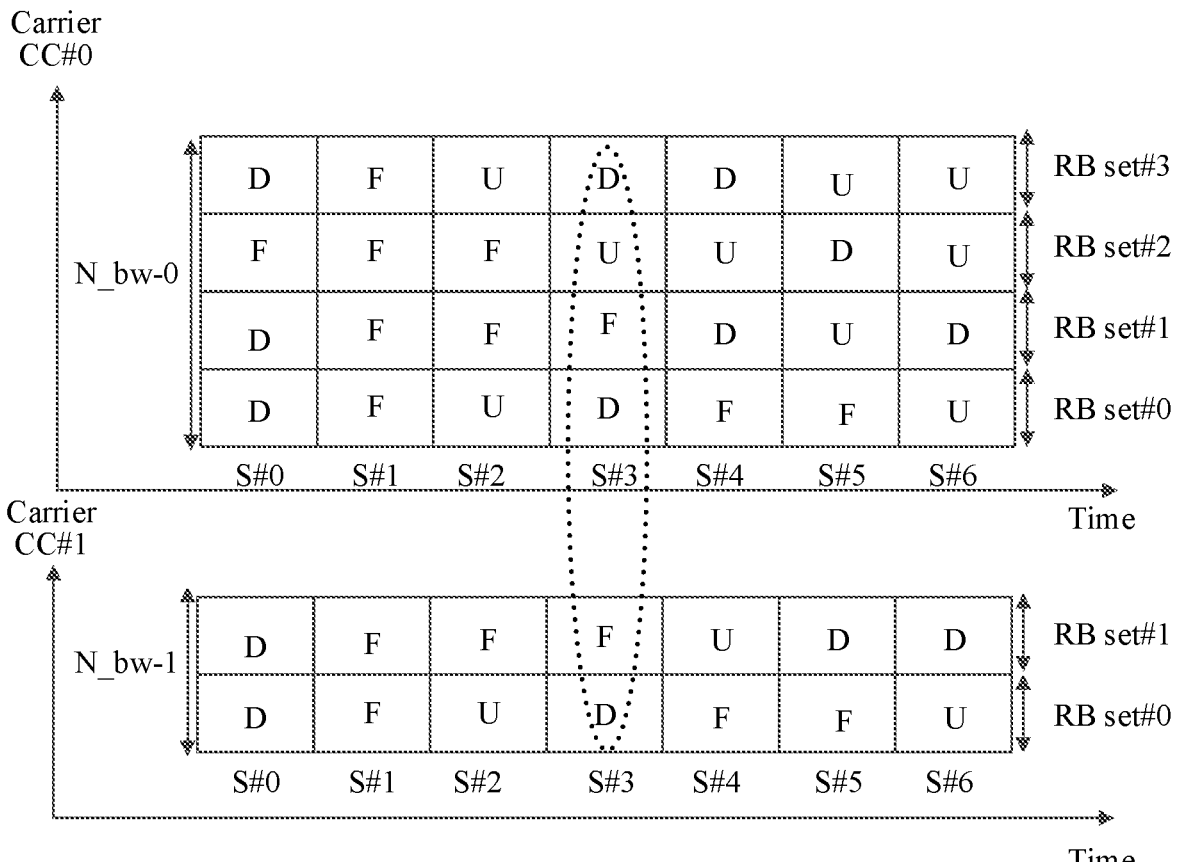
FIG. 4 represents a second schematic configuration diagram of a transmission direction of a frequency domain unit according to an embodiment of this application.

The following clearly describes the technical solutions in the embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application shall fall within the protection scope of this application.

In the specification and claims of this application, the terms "first", "second", and the like are used to distinguish similar objects, but are not used to describe a specific sequence or order. It may be understood that the data used in such a way is interchangeable in proper circumstances, so that the embodiments of this application described herein can be implemented in other sequences than the sequence illustrated or described herein, and the objects distinguished through "first" and "second" are generally of a same type and the number of the objects are not limited, for example, a first object may be one or more than one. In addition, "and/or" in this specification and the claims represents at least one of the connected objects, and a character "I" used herein indicates an "or" relationship between associated objects.

It is to be noted that the technologies described in the embodiments of this application are not limited to a long term evolution (LTE)/LTE-advanced (LTE-A) system, and may be further applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described can be applied to the systems and radio technologies mentioned above, and can also be applied to other systems and radio technologies. The following exemplarily describes a new radio (NR) system, and NR terms are used in most of the descriptions below. However, these technologies can also be applied to applications other than NR system applications, for example, a $6^{th}$ generation (6G) communication system.

FIG. 1 shows a structural diagram of a wireless communication system to which an embodiment of this application is applicable. The wireless communication system includes a terminal 11 and a network side device 12. The terminal 11 may also be referred to as a terminal device or user equipment (UE), and the terminal 11 may be a terminal side device, such as a mobile phone, a tablet computer, a laptop computer also referred to as a notebook computer, a personal digital assistant (PDA), a handheld computer, a netbook, an ultra-mobile personal computer (UMPC), a mobile Internet device (MID), a wearable device (Wearable Device) or vehicle user equipment (VUE), or pedestrian user equipment (PUE). The wearable device includes: a smart watch, a hand ring, a headset, a pair of glasses, or the like. It is to be noted that, a specific type of the terminal 11 is not limited in the embodiments of this application. The network side device 12 may be a base station or a core network device, where the base station may be referred to as a NodeB, an evolved NodeB (eNB), an access point, a base transceiver station (BTS), a radio base station, a radio transceiver, a basic service set (BBS), an extended service set (ESS), a B node, a home B node, a home evolved B node, a WLAN access point, a WiFi node, a transmission reception point (TRP), or any proper term in the field, provided that a same technical effect can be reached. The base station is not limited to a specific technical word. It is to be noted that, the base station in the NR system is only used as an example in the embodiments of this application, but a specific type of the base station is not limited.

The transmission direction determining method according to the embodiments of this application is described in detail below with reference to the accompanying drawings through specific embodiments and application scenarios thereof.

As shown in FIG. 2, an embodiment of this application provides a transmission direction determining method, including the following steps.

Step 201: A terminal determines a transmission direction corresponding to a time unit based on first indication signaling, where the transmission direction includes an uplink transmission direction, a downlink transmission direction, or a flexible transmission direction.

The flexible transmission direction is capable of being indicated as at least one of the following:

an uplink transmission direction;

a downlink transmission direction; and a flexible direction not for receiving and sending.

Specifically, the foregoing flexible transmission direction may be further indicated by the foregoing first indication signaling as the uplink transmission direction, the downlink transmission direction, or the flexible direction not for receiving and sending.

In this embodiment of this application, the terminal is a terminal without a full duplex capability in a flexible/full duplex system. The foregoing time unit includes X1 slots, or includes X2 symbols, $X1 \geq 1$, and $X2 \geq 1$. The foregoing frequency domain unit may be at least one of a subband, a bandwidth part (BWP), a resource block set (RB set), and a resource block group (RB G) set.

Optionally, the foregoing first indication signaling includes at least one of the following:

high layer signaling;

radio resource control (RRC) signaling;

dynamic signaling; and a system message.

Further, optionally, the system message includes at least one selected from the group of full duplex uplink/downlink common configuration information and flexible duplex uplink/downlink common configuration information (XDD/TDD-UL-DL-ConfigurationCommon).

The RRC signaling includes at least one selected from the group of full duplex uplink/downlink dedicated configuration information and flexible duplex uplink/downlink dedicated configuration information (XDD/TDD-UL-DL-ConfigDedicated).

In an embodiment of this application, a downlink transmission direction (D), an uplink transmission direction (U), and a flexible transmission direction (F) that are semi-statically configured by the XDD/TDD-UL-DL-ConfigurationCommon and/or the XDD/TDD-UL-DL-ConfigDedicated are recorded as Semi-static D, Semi-static U, and Semi-static F respectively;

semi-static downlink transmission configured by a high layer/RRC, for example, a physical downlink control channel (PDCCH), a physical downlink shared channel (PDSCH), a channel state information reference signal (CSI-RS), or a positioning reference signal PRS), is recorded as RRC D;

semi-static uplink transmission configured by a high layer/RRC, for example, a sounding reference signal (SRS), a physical uplink shared channel (PUSCH), a physical uplink control channel (PUCCH), or a physical random access channel (PRACH), is recorded as RRC U;

D, U, or F that is indicated by dynamic signaling, for example, downlink control information (DCI) (which may be user-specific control signaling: UE-specific DCI and/or user group-common control signaling: group-common DCI), is recorded as Dynamic (Dynamic) D, Dynamic U, or Dynamic F;

a transmission direction corresponding to a synchronization signal and physical broadcast channel signal block (Synchronization Signal and PBCH block, SSB) position (ssb-PositionsInBurst) in a system message SIB1 or ssb-PositionsInBurst in serving cell configuration common signaling (ServingCellConfigCommon) is recorded as SSB in ssb-PositionsInBurst; and a control resource set configured by PDCCH-ConfigSIB1 in a master information block (MIB) for a type0-PDCCH common search space (Type0-PDCCH CSS) is recorded as CORESET for the Type0-PDCCH CSS.

In the embodiments of this application, a terminal determines a transmission direction, for example, an uplink transmission direction, a downlink transmission direction, or a flexible transmission direction, corresponding to a time unit based on first indication signaling, so that a terminal without a full duplex capability is enabled to determine a transmission direction of a time unit in a flexible/full duplex system.

Optionally, in this embodiment of this application, the transmission direction corresponding to the time unit may be directly indicated by the foregoing first indication signaling, or a transmission direction corresponding to at least one frequency domain unit in the time unit may be indicated by the foregoing first indication signaling, and then the terminal determines the transmission direction corresponding to the time unit based on the transmission direction corresponding to the at least one frequency domain unit.

Based on this, that a terminal determines a transmission direction corresponding to a time unit based on first indication signaling includes:

that the terminal determines a transmission direction corresponding to at least one frequency domain unit in the time unit based on the first indication signaling, where the transmission direction corresponding to the frequency domain unit includes an uplink transmission direction, a downlink transmission direction, or a flexible transmission direction; and the terminal determines the transmission direction corresponding to the time unit based on the transmission direction corresponding to the frequency domain unit.

In this embodiment of this application, a terminal determines a transmission direction corresponding to at least one frequency domain unit in a time unit based on first indication signaling, where the transmission direction corresponding to the frequency domain unit includes an uplink transmission direction, a downlink transmission direction, or a flexible transmission direction; and the terminal determines a transmission direction corresponding to the time unit based on the transmission direction corresponding to the frequency domain unit, so that a terminal without a full duplex capability is enabled to determine a transmission direction of a time unit in a flexible/full duplex system.

In this embodiment of this application, a bandwidth supporting a full duplex or flexible duplex frequency band, a cell, a carrier, or a set bandwidth part (BWP) on a carrier is recorded as N_bw, N_bw in the time unit may be classified as at least one frequency domain unit, and a sum of bandwidths of the at least one frequency domain unit is less than or equal to N_bw. An example in which the frequency domain unit is a RB set is used in the following embodiment for description.

As a first optional implementation, that the terminal determines the transmission direction corresponding to the time unit based on the transmission direction corresponding to the frequency domain unit includes:

that the terminal determines, in a case that the transmission direction corresponding to the frequency domain unit includes at least one of the following (where the transmission direction corresponding to the frequency domain unit may be understood as transmission directions corresponding to all frequency domain units on N carriers configured for the terminal, or transmission directions corresponding to all frequency domain units on an activated BWP), that the transmission direction corresponding to the time unit is the downlink transmission direction:

a downlink transmission direction semi-statically indicated by a system message, namely, Semi-static D;

a downlink transmission direction semi-statically indicated by RRC signaling, namely, Semi-static D;

downlink transmission indicated by high layer signaling or the RRC signaling, namely, RRC D;

a downlink transmission direction indicated by dynamic signaling, namely, Dynamic D;

a transmission direction corresponding to a synchronization signal and physical broadcast channel signal block SSB position in a system message 1, namely, SSB in ssb-PositionsInBurst;

a transmission direction corresponding to an SSB position indicated in serving cell configuration common signaling, namely, ServingCellConfigCommon; and a transmission direction corresponding to a control resource set for a first physical downlink control channel PDCCH common search space in a master information block, namely, CORESET for Type0-PDCCH CSS, where the first PDCCH is a Type0-PDCCH.

As a second optional implementation, that the terminal determines the transmission direction corresponding to the time unit based on the transmission direction corresponding to the frequency domain unit includes:

that the terminal determines, in a case that the transmission direction corresponding to the frequency domain unit includes at least one of the following (where the transmission direction corresponding to the frequency domain unit may be understood as transmission directions corresponding to all frequency domain units on N carriers configured for the terminal, or transmission directions corresponding to all frequency domain units on an activated BWP), that the transmission direction corresponding to the time unit is the uplink transmission direction:

an uplink transmission direction semi-statically indicated by a system message, namely, Semi-static U;

an uplink transmission direction semi-statically indicated by RRC signaling, namely, Semi-static U;

an uplink transmission direction corresponding to uplink transmission indicated by high layer signaling or the RRC signaling, namely, RRC U; and an uplink transmission direction indicated by dynamic signaling, namely, Dynamic U.

As a third optional implementation, that the terminal determines the transmission direction corresponding to the time unit based on the transmission direction corresponding to the frequency domain unit includes:

that the terminal determines, in a case that the transmission direction corresponding to the at least one frequency domain unit includes at least one of the following (where the transmission direction corresponding to the frequency domain unit may be understood as transmission directions corresponding to all frequency domain units on N carriers configured for the terminal, or transmission directions corresponding to all frequency domain units on an activated BWP), that the transmission direction corresponding to the time unit is the flexible transmission direction:

a flexible transmission direction semi-statically indicated by a system message, namely, Semi-static F;

a flexible transmission direction semi-statically indicated by RRC signaling, namely, Semi-static F; and a flexible transmission direction indicated by dynamic signaling, namely, Dynamic F.

As a fourth optional implementation, that the terminal determines the transmission direction corresponding to the time unit based on the transmission direction corresponding to the frequency domain unit includes:

that the terminal determines, in a case that the time unit includes at least one first frequency domain unit and a transmission direction corresponding to a second frequency domain unit is a flexible transmission direction, that the transmission direction corresponding to the time unit is the downlink transmission direction, where the first frequency domain unit is a frequency domain unit whose corresponding transmission direction is determined as the downlink transmission direction based on the first indication signaling, and the second frequency domain unit is a frequency domain unit other than the first frequency domain unit in the time unit.

Specifically, if a transmission direction, in the time unit, of at least one RB set in all RB sets (s) on N carriers configured for UE or on an activated BWP is the downlink transmission direction determined based on the foregoing first indication signaling, and the rest RB sets are F or semi-static F determined based on the first indication signaling, it is determined that the transmission direction corresponding to the time unit is the downlink transmission direction.

As a fifth optional implementation, that the terminal determines the transmission direction corresponding to the time unit based on the transmission direction corresponding to the frequency domain unit includes:

that the terminal determines, in a case that the time unit includes at least one third frequency domain unit and a transmission direction corresponding to a fourth frequency domain unit is a flexible transmission direction, that the transmission direction corresponding to the time unit is the uplink transmission direction, where the third frequency domain unit is a frequency domain unit whose corresponding transmission direction is determined as the uplink transmission direction based on the first indication signaling, and the fourth frequency domain unit is a frequency domain unit other than the third frequency domain unit in the time unit.

Specifically, if a transmission direction, in the time unit, of at least one RB set in all RB sets (s) on N carriers configured for UE or on an activated BWP is the uplink transmission direction determined based on the foregoing first indication signaling, and the rest RB sets are F or semi-static F determined based on the first indication signaling, it is determined that the transmission direction corresponding to the time unit is the uplink transmission direction.

As a sixth optional implementation, that the terminal determines the transmission direction corresponding to the time unit based on the transmission direction corresponding to the frequency domain unit includes:

that the terminal determines, in a case that transmission directions of any two frequency domain units in the time unit are determined as a first preset transmission direction combination based on the first indication signaling, the transmission direction corresponding to the time unit based on a preset rule, where the preset rule includes at least one of the following:

a first item: determining the transmission direction corresponding to the time unit based on a transmission direction corresponding to a frequency domain unit having a minimum index in the time unit;

a second item: determining the transmission direction corresponding to the time unit based on a transmission direction corresponding to a reference frequency domain unit in the time unit;

a third item: determining the transmission direction corresponding to the time unit based on a relationship among a first value, a second value, and a third value, where the first value is a quantity of frequency domain units whose corresponding transmission directions are uplink transmission directions in the time unit, the second value is a quantity of frequency domain units whose corresponding transmission directions are downlink transmission directions in the time unit, and the third value is a quantity of frequency domain units whose corresponding transmission directions are flexible transmission directions in the time unit;

a fourth item: determining as a preset transmission direction by default, where the preset transmission direction includes the uplink transmission direction, the downlink transmission direction, or the flexible transmission direction;

a fifth item: determining as an error network configuration;

a sixth item: determining, by the terminal, the transmission direction corresponding to the time unit;

a seventh item: determining the transmission direction corresponding to the time unit based on dynamic signaling on a target carrier;

an eighth item: determining the transmission direction corresponding to the time unit based on dynamic signaling on an activated bandwidth part BWP on a target carrier;

a ninth item: determining the transmission direction corresponding to the time unit based on target information of a to-be-processed signal on a target carrier; and a tenth item: determining the transmission direction corresponding to the time unit based on target information of a to-be-processed signal on an activated BWP on a target carrier, where the target information includes at least one selected from the group of a signal priority, signal content, a channel on which a signal is located, and a signal size; and the target carrier is all carriers (for example, N carriers configured for the terminal) in the time unit or a first carrier in the time unit.

Further, optionally, the first carrier includes at least one of the following:

a carrier having a maximum or minimum index in all active carriers;

a reference carrier configured or indicated by a network; and a carrier that has a maximum or minimum index in a first carrier set of the time unit and has an uplink or downlink transmission direction, where the first carrier set is a set of active carriers other than active carriers whose transmission directions are flexible transmission directions in the time unit.

Further, optionally, the first preset transmission direction combination includes at least one of the following:

a downlink transmission direction and an uplink transmission direction;

a semi-statically indicated downlink transmission direction and a dynamically indicated flexible transmission direction;

a semi-statically indicated uplink transmission direction and a dynamically indicated flexible transmission direction;

a transmission direction corresponding to an SSB position in a system message 1 and a dynamically indicated flexible transmission direction;

a transmission direction corresponding to an SSB position indicated in serving cell configuration common signaling and a dynamically indicated flexible transmission direction; and a transmission direction corresponding to a control resource set for a first PDCCH common search space in a master information block and a dynamically indicated flexible transmission direction.

In this embodiment of this application, for details about the foregoing first preset transmission direction combination, refer to Table 1.

TABLE 1

|  | RB set #i | RB set #j |
| --- | --- | --- |
| Combination 1 | D | U |
| Combination 2 | U | D |
| Combination 3 | Semi-static D | Dynamic F |
| Combination 4 | Semi-static U | Dynamic F |
| Combination 5 | SSB in ssb-PositionsInBurst | Dynamic F |
| Combination 6 | CORESET for Type0-PDCCH CSS | Dynamic F |

For the foregoing first item, a carrier X on a frequency f1, from a time unit S #0 to a time unit S #6, configuration and indication of transmission directions of four RB sets (RB set #0 to RB set #3) in each time unit are as shown in FIG. 3. Based on a transmission direction of a frequency domain unit having a minimum index, a transmission direction of a time unit S #3 is determined as D, a transmission direction of a time unit S #4 is determined as F, a transmission direction of a time unit S #5 is determined as F, and a transmission direction of a time unit S #6 is determined as U.

For the foregoing second item, the reference frequency domain unit may be a frequency domain unit, for example, a K$^{th}$ RB set, configured and/or indicated by a network, where K is a maximum or minimum index in N_bw, or K is a minimum index, a maximum index, or any index of RB set(s) including an initial DL/UL BWP;

or the reference frequency domain unit is a frequency domain unit, for example, a frequency domain unit having a maximum index or a minimum index, in the time unit except a frequency domain unit whose transmission direction is F and that is determined in an RB set.

Refer to FIG. 3, assuming that the reference frequency domain unit is an RB set #2, the transmission direction of the time unit S #3 is determined as U, the transmission direction of the time unit S #4 is determined as U, the transmission direction of the time unit S #5 is determined as D, and the transmission direction of the time unit S #6 is determined as U. Assuming that the reference frequency domain unit is an RB set having a minimum index in RB sets except an RB set whose transmission direction is F, the transmission direction of the time unit S #3 is determined as D, the transmission direction of the time unit S #4 is determined as D, the transmission direction of the time unit S #5 is determined as U, and the transmission direction of the time unit S #6 is determined as U.

For the foregoing third item: assuming that the first value is recorded as T_U, the second value is recorded as T_D, and the third value is recorded as T_F, when T_D>T_U and T_D≥T_F, the transmission direction of the time unit is determined as D; when T_U>T_D and T_U≥T_F, the transmission direction of the time unit is determined as U; when T_F>T_D and T_F≥T_U, the transmission direction of the time unit is determined as F; and when T_D=T_U, it is determined as an error network configuration or indication, or the terminal determines the transmission direction.

Refer to FIG. 3, assuming that the transmission direction corresponding to the time unit is determined based on the relationship among the first value, the second value, and the third value, the transmission direction corresponding to the time unit is determined based on a transmission direction corresponding to a maximum value. For example, in the time unit S #3, T_D=2, T_F=1, and T_U=1, so that the transmission direction is D; in the time unit S #4, T_D=2, T_F=1, and T_U=1, so that the transmission direction is D; in the time unit S #5, T_D=1, T_F=1, and T_U=2, so that the transmission direction is U; and in the time unit S #6, T_D=1, T_F=0, and T_U=3, so that the transmission direction is U.

For the foregoing fourth item, for the combination 1, the combination 2, and the combination 4 in the foregoing Table 1, the transmission direction may be determined as U by default, and for the combination 3 and the combination 4 in the foregoing Table 1, the transmission direction may be determined as F by default.

For the foregoing seventh and eighth items, refer to FIG. 3, the transmission direction of the time unit S #3 is D indicated through terminal-specific DCI or common DCI; the transmission direction of the time unit S #4 is D indicated through terminal-specific DCI or common DCI; the transmission direction of the time unit S #5 is F indicated through terminal-specific DCI or common DCI; and the transmission direction of the time unit S #6 is U indicated through terminal-specific DCI or common DCI. In addition, if a plurality of terminal-specific dynamic signaling or common dynamic signaling simultaneously exists, the transmission direction is determined based on latest dynamic signaling.

For the foregoing ninth and tenth items, assuming that the transmission direction corresponding to the time unit is determined based on the signal priority, a target carrier X is first determined, and then the transmission direction corresponding to the time unit is determined based on a priority of a to-be-processed signal on the target carrier X. It is assumed that downlink data/control information/a reference signal of a first priority>uplink data/control information/a reference signal of a second priority or the first priority, or uplink data/control information/a reference signal of a first priority>downlink data/control information/a reference signal of a second priority or the first priority, for example, SSB>PRACH>PDCCH>PUCCH>uplink data including uplink control information (UCI)>PDSCH>uplink data without uplink control information (UCI). Refer to FIG. 3, if a to-be-processed signal on the RB set #2 in the time unit S #3 is a configured grant PUSCH, and a to-be-processed signal on the RB set #3 in the time unit S #3 is an SSB, a transmission direction D corresponding to the time unit S #3 is determined; if a to-be-processed signal on the RB set #2 in the time unit S #4 is a configured grant PUSCH of a first priority, and a to-be-processed signal on the RB set #3 in the time unit S #4 is a PDSCH of a first priority, a transmission direction D corresponding to the time unit S #4 is determined; if a to-be-processed signal on the RB set #2 in the time unit S #5 is a PDSCH of a second priority, and a to-be-processed signal on the RB set #3 in the time unit S #5 is a configured grant PUSCH of a first priority, a transmission direction U corresponding to the time unit S #5 is determined; and if a to-be-processed signal on the RB set #2 in the time unit S #6 is a PDSCH, and a to-be-processed signal on the RB set #3 in the time unit S #6 is an PUCCH, a transmission direction U corresponding to the time unit S #6 is determined.

Alternatively, the transmission direction corresponding to the time unit is determined based on target information of to-be-processed signals on all carriers. Refer to FIG. 4, the transmission direction corresponding to the time unit S #3 is determined based on a priority of to-be-processed signals of all RB sets in the time unit S #3 on a carrier CC #0 and a carrier CC #1. Assuming that a transmission priority of a to-be-processed signal on the RB set #3 in the time unit S #3 on the carrier CC #0 is the highest, the transmission direction corresponding to the time unit S #3 is determined as D. A determining method of another time unit is similar and details are not described herein again.

As a seventh optional implementation, that the terminal determines the transmission direction corresponding to the time unit based on the transmission direction corresponding to at least one the frequency domain unit includes:

determining, in a case that transmission directions of any two frequency domain units in the time unit are determined as a second preset transmission direction combination based on the first indication signaling, that the transmission direction corresponding to the time unit is the uplink transmission direction;

in a case that transmission directions of any two frequency domain units in the time unit are determined as a third preset transmission direction combination based on the first indication signaling, determining that the transmission direction corresponding to the time unit is the downlink transmission direction or the flexible transmission direction if a time difference between a first symbol and a second symbol is greater than or equal to processing time of the terminal; if the time difference between the first symbol and the second symbol is less than the processing time of the terminal, determining that the transmission direction corresponding to the time unit is the uplink transmission direction or determining as an error network configuration; and determining, in a case that transmission directions of any two frequency domain units in the time unit are determined as a third preset transmission direction combination based on the first indication signaling, that the transmission direction corresponding to the time unit is the downlink transmission direction or the flexible transmission direction, where a time difference between a first symbol and a second symbol that are configured by a network is greater than or equal to processing time of the terminal, where the second preset transmission direction combination includes at least one of the following (for details, refer to a combination 1 and a combination 2 in Table 2):

a semi-statically indicated downlink transmission direction, and an uplink transmission direction or a flexible transmission direction that is dynamically indicated; and a downlink transmission direction corresponding to downlink transmission indicated by high layer signaling or RRC signaling, and an uplink transmission direction or a flexible transmission direction that is dynamically indicated;

the third preset transmission direction combination includes at least one of the following (for details, refer to a combination 3 and a combination 4 in Table 2):

a semi-statically indicated uplink transmission direction, and a downlink transmission direction or a flexible transmission direction that is dynamically indicated; and an uplink transmission direction corresponding to uplink transmission indicated by high layer signaling or RRC signaling, and a downlink transmission direction or a flexible transmission direction that is dynamically indicated; and the first symbol is a start symbol of uplink transmission of a first frequency domain unit in the any two frequency domain units, and the second symbol is a last symbol of downlink transmission dynamic signaling of a second frequency domain unit in the any two frequency domain units, where the downlink dynamic signaling is for determining downlink transmission or flexible transmission.

TABLE 2

| Case | RB set #i | RB set #j |
|---|---|---|
| Combination 1 | Semi-static D | Dynamic U or Dynamic F |
| Combination 2 | RRC D | Dynamic U or Dynamic F |
| Combination 3 | Semi-static U | Dynamic D or Dynamic F |
| Combination 4 | RRC U | Dynamic D or Dynamic F |

Figure 5:
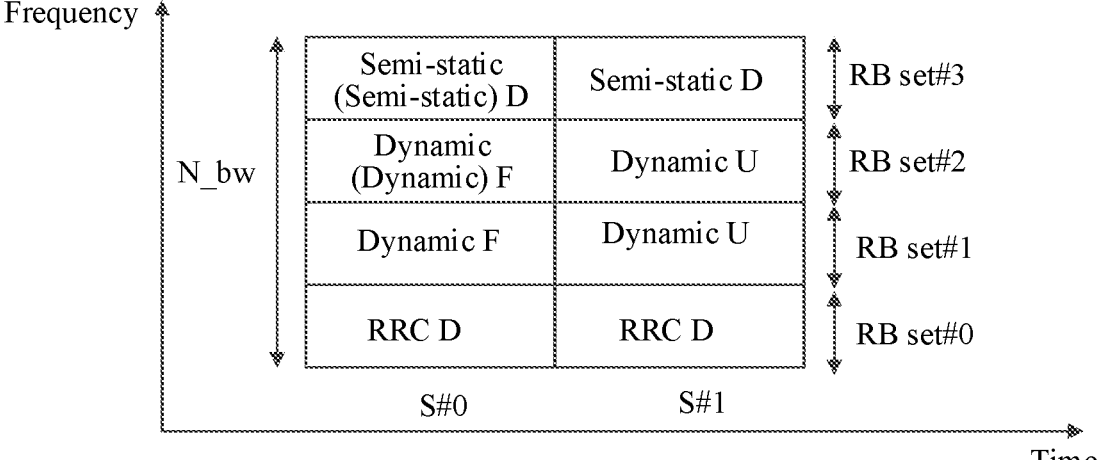
FIG. 5 represents a third schematic configuration diagram of a transmission direction of a frequency domain unit according to an embodiment of this application.

As shown in FIG. 5, assuming that transmission directions corresponding to RB sets #0 to 3 in the time unit S #0 are RRC D, Dynamic F, Dynamic F, and Semi-static D respectively; and transmission directions corresponding to RB sets #0 to 3 in the time unit S #1 are RRC D, Dynamic U, Dynamic U, and Semi-static D respectively, it is determined that the transmission direction corresponding to the time unit S #0 is F, and the transmission direction corresponding to the time unit S #1 is U.

As an eighth optional implementation, that the terminal determines the transmission direction corresponding to the time unit based on the transmission direction corresponding to at least one the frequency domain unit includes:

that the terminal determines, in a case that a transmission direction corresponding to any frequency domain unit in the time unit is at least one of the following, that the transmission direction corresponding to the time unit is the downlink transmission direction, and performs a corresponding downlink action:

a transmission direction corresponding to an SSB transmission occasion indicated by an SSB position;

a transmission direction corresponding to transmission time indicated by an SSB measurement timing configuration (SS/PSCH block Measurement Timing Configuration, SMTC);

a transmission direction corresponding to a downlink measurement reference signal;

a transmission direction corresponding to a valid tracking reference signal; and a transmission direction corresponding to a control resource set for a first physical downlink control channel PDCCH common search space.

The foregoing downlink measurement reference signal includes at least one of the following:

a radio link monitoring (RLM) signal;

a link recovery signal;

a radio resource management (RRM) signal; and an L1 reference signal received power (L-RSRP).

The foregoing valid tracking reference signal may be configured through at least one of system message, high layer signaling, and dynamic signaling, for example, indicated through a paging early indication or indicated through a paging PDCCH.

In this embodiment of this application, a terminal determines a transmission direction, for example, an uplink transmission direction, a downlink transmission direction, or a flexible transmission direction, corresponding to a time unit based on first indication signaling, so that a terminal without a full duplex capability is enabled to determine a transmission direction of a time unit in a flexible/full duplex system.

As shown in FIG. 6, an embodiment of this application provides a transmission direction determining method, including the following steps.

Step 601: A network side device sends first indication signaling, where the first indication signaling is for determining a transmission direction corresponding to a time unit, where the transmission direction includes an uplink transmission direction, a downlink transmission direction, or a flexible transmission direction; and the flexible transmission direction is as at least one of the following:

an uplink transmission direction;

a downlink transmission direction; and a flexible direction not for receiving and sending.

Optionally, the first indication signaling includes at least one of the following:

high layer signaling;

radio resource control RRC signaling;

dynamic signaling; and a system message.

Optionally, the system message includes at least one selected from the group of full duplex uplink/downlink common configuration information and flexible duplex uplink/downlink common configuration information.

Optionally, the RRC signaling includes at least one selected from the group of full duplex uplink/downlink dedicated configuration information and flexible duplex uplink/downlink dedicated configuration information.

The foregoing first indication signaling has been described in detail in the foregoing terminal side embodiment, and details not described herein again According to the transmission direction determining method in this embodiment of this application, a network side device sends first indication signaling, where the first indication signaling is for determining a transmission direction corresponding to a time unit, so that a terminal without a full duplex capability is enabled to determine a transmission direction of a time unit in a flexible/full duplex system.

It is to be noted that, the transmission direction determining method according to this embodiment of this application may be performed by a transmission direction determining apparatus, or, a control module configured to perform the transmission direction determining method in the transmission direction determining apparatus. In an embodiment of this application, that the transmission direction determining apparatus performs the transmission direction determining method is taken as an example for description of the transmission direction determining apparatus according to this embodiment of this application.

As shown in FIG. 7, an embodiment of this application further provides a transmission direction determining apparatus 700, including:

a first determining module 701, configured to determine a transmission direction corresponding to a time unit based on first indication signaling, where the transmission direction includes an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending.

Optionally, the apparatus of this embodiment of this application further includes:

a first receiving module, configured to receive the first indication signaling.

Optionally, the first determining module includes:

a first determining submodule, configured to determine a transmission direction corresponding to at least one frequency domain unit in the time unit based on the first indication signaling, where the transmission direction corresponding to the frequency domain unit includes an uplink transmission direction, a downlink transmission direction, or a flexible transmission direction; and a second determining submodule, configured to determine the transmission direction corresponding to the time unit based on the transmission direction corresponding to the frequency domain unit.

Optionally, the first indication signaling includes at least one of the following:

high layer signaling;

radio resource control RRC signaling;

dynamic signaling; and a system message.

Optionally, the system message includes at least one selected from the group of full duplex uplink/downlink common configuration information and flexible duplex uplink/downlink common configuration information.

Optionally, the RRC signaling includes at least one selected from the group of full duplex uplink/downlink dedicated configuration information and flexible duplex uplink/downlink dedicated configuration information.

Optionally, the second determining submodule is configured to determine, in a case that the transmission direction corresponding to the frequency domain unit includes at least one of the following, that the transmission direction corresponding to the time unit is the downlink transmission direction:

a downlink transmission direction semi-statically indicated by a system message;

a downlink transmission direction semi-statically indicated by RRC signaling;

downlink transmission indicated by high layer signaling or the RRC signaling;

a downlink transmission direction indicated by dynamic signaling;

a transmission direction corresponding to a synchronization signal and physical broadcast channel signal block SSB position in a system message 1;

a transmission direction corresponding to an SSB position indicated in serving cell configuration common signaling; and a transmission direction corresponding to a control resource set for a first physical downlink control channel PDCCH common search space in a master information block.

Optionally, the second determining submodule is configured to determine, in a case that the transmission direction corresponding to the frequency domain unit includes at least one of the following, that the transmission direction corresponding to the time unit is the uplink transmission direction:

an uplink transmission direction semi-statically indicated by a system message;

an uplink transmission direction semi-statically indicated by RRC signaling;

an uplink transmission direction corresponding to uplink transmission indicated by high layer signaling or the RRC signaling; and an uplink transmission direction indicated by dynamic signaling.

Optionally, the second determining submodule is configured to determine, in a case that the transmission direction corresponding to the frequency domain unit includes at least one of the following, that the transmission direction corresponding to the time unit is the flexible transmission direction:

a flexible transmission direction semi-statically indicated by a system message;

a flexible transmission direction semi-statically indicated by RRC signaling; and a flexible transmission direction indicated by dynamic signaling.

Optionally, the second determining submodule is configured to determine, in a case that the time unit includes at least one first frequency domain unit and a transmission direction corresponding to a second frequency domain unit is a flexible transmission direction, that the transmission direction corresponding to the time unit is the downlink transmission direction, where the first frequency domain unit is a frequency domain unit whose corresponding transmission direction is determined as the downlink transmission direction based on the first indication signaling, and the second frequency domain unit is a frequency domain unit other than the first frequency domain unit in the time unit.

Optionally, the second determining submodule is configured to determine, in a case that the time unit includes at least one third frequency domain unit and a transmission direction corresponding to a fourth frequency domain unit is a flexible transmission direction, that the transmission direction corresponding to the time unit is the uplink transmission direction, where the third frequency domain unit is a frequency domain unit whose corresponding transmission direction is determined as the uplink transmission direction based on the first indication signaling, and the fourth frequency domain unit is a frequency domain unit other than the third frequency domain unit in the time unit.

Optionally, the second determining submodule is configured to determine, in a case that transmission directions of any two frequency domain units in the time unit are determined as a first preset transmission direction combination based on the first indication signaling, the transmission direction corresponding to the time unit based on a preset rule, where the preset rule includes at least one of the following:

determining the transmission direction corresponding to the time unit based on a transmission direction corresponding to a frequency domain unit having a minimum index in the time unit;

determining the transmission direction corresponding to the time unit based on a transmission direction corresponding to a reference frequency domain unit in the time unit;

determining the transmission direction corresponding to the time unit based on a relationship among a first value, a second value, and a third value, where the first value is a quantity of frequency domain units whose corresponding transmission directions are uplink transmission directions in the time unit, the second value is a quantity of frequency domain units whose corresponding transmission directions are downlink transmission directions in the time unit, and the third value is a quantity of frequency domain units whose corresponding transmission directions are flexible transmission directions in the time unit;

determining as a preset transmission direction by default, where the preset transmission direction includes the uplink transmission direction, the downlink transmission direction, or the flexible transmission direction;

determining as an error network configuration;

determining, by the terminal, the transmission direction corresponding to the time unit;

determining the transmission direction corresponding to the time unit based on dynamic signaling on a target carrier;

determining the transmission direction corresponding to the time unit based on dynamic signaling on an activated bandwidth part BWP on a target carrier;

determining the transmission direction corresponding to the time unit based on target information of a to-be-processed signal on a target carrier; and determining the transmission direction corresponding to the time unit based on target information of a to-be-processed signal on an activated BWP on a target carrier, where the target information includes at least one selected from the group of a signal priority, signal content, a channel on which a signal is located, and a signal size; and the target carrier is all carriers in the time unit or a first carrier in the time unit.

Optionally, the first carrier includes at least one of the following:

a carrier having a maximum or minimum index in all active carriers;

a reference carrier configured or indicated by a network; and a carrier that has a maximum or minimum index in a first carrier set of the time unit and has an uplink or downlink transmission direction, where the first carrier set is a set of active carriers other than active carriers whose transmission directions are flexible transmission directions in the time unit.

Optionally, the first preset transmission direction combination includes at least one of the following:

a downlink transmission direction and an uplink transmission direction;

a semi-statically indicated downlink transmission direction and a dynamically indicated flexible transmission direction;

a semi-statically indicated uplink transmission direction and a dynamically indicated flexible transmission direction;

a transmission direction corresponding to an SSB position in a system message 1 and a dynamically indicated flexible transmission direction;

a transmission direction corresponding to an SSB position indicated in serving cell configuration common signaling and a dynamically indicated flexible transmission direction; and a transmission direction corresponding to a control resource set for a first PDCCH common search space in a master information block and a dynamically indicated flexible transmission direction.

Optionally, the second determining submodule is configured to perform at least one of the following:

determining, in a case that transmission directions of any two frequency domain units in the time unit are determined as a second preset transmission direction combination based on the first indication signaling, that the transmission direction corresponding to the time unit is the uplink transmission direction;

in a case that transmission directions of any two frequency domain units in the time unit are determined as a third preset transmission direction combination based on the first indication signaling, determining that the transmission direction corresponding to the time unit is the downlink transmission direction or the flexible transmission direction if a time difference between a first symbol and a second symbol is greater than or equal to processing time of the terminal; if the time difference between the first symbol and the second symbol is less than the processing time of the terminal, determining that the transmission direction corresponding to the time unit is the uplink transmission direction or determining as an error network configuration; and determining, in a case that transmission directions of any two frequency domain units in the time unit are determined as a third preset transmission direction combination based on the first indication signaling, that the transmission direction corresponding to the time unit is the downlink transmission direction or the flexible transmission direction, where a time difference between a first symbol and a second symbol that are configured by a network is greater than or equal to processing time of the terminal, where the second preset transmission direction combination includes at least one of the following:

a semi-statically indicated downlink transmission direction, and an uplink transmission direction or a flexible transmission direction that is dynamically indicated; and a downlink transmission direction corresponding to downlink transmission indicated by high layer signaling or RRC signaling, and an uplink transmission direction or a flexible transmission direction that is dynamically indicated;

the third preset transmission direction combination includes at least one of the following:

a semi-statically indicated uplink transmission direction, and a downlink transmission direction or a flexible transmission direction that is dynamically indicated; and an uplink transmission direction corresponding to uplink transmission indicated by high layer signaling or RRC signaling, and a downlink transmission direction or a flexible transmission direction that is dynamically indicated; and the first symbol is a start symbol of uplink transmission of a first frequency domain unit in the any two frequency domain units, and the second symbol is a last symbol of downlink transmission or flexible transmission of a second frequency domain unit in the any two frequency domain units.

Optionally, the second determining submodule is configured by the terminal to determine, in a case that a transmission direction corresponding to any frequency domain unit in the time unit is at least one of the following, that the transmission direction corresponding to the time unit is the downlink transmission direction, and perform a corresponding downlink action:

a transmission direction corresponding to an SSB transmission occasion indicated by an SSB position;

a transmission direction corresponding to transmission time indicated by an SSB measurement timing configuration;

a transmission direction corresponding to a downlink measurement reference signal;

a transmission direction corresponding to a valid tracking reference signal; and a transmission direction corresponding to a control resource set for a first physical downlink control channel PDCCH common search space.

In the apparatus of this embodiment of this application, a terminal determines a transmission direction, for example, an uplink transmission direction, a downlink transmission direction, or a flexible transmission direction, corresponding to a time unit based on first indication signaling, so that a terminal without a full duplex capability is enabled to determine a transmission direction of a time unit in a flexible/full duplex system.

The transmission direction determining apparatus in this embodiment of this application may be an apparatus, or an apparatus or electronic device having an operating system, or may be a component, an integrated circuit, or a chip in a terminal. The apparatus or the electronic device may be a mobile terminal or may be a non-mobile terminal. Exemplarily, the mobile terminal may include but is not limited to the category of the terminal 11 listed above. The non-mobile terminal may be a server, a network attached storage (NAS), a personal computer (PC), a television (TV), a teller machine, a self-service machine, or the like, which is not specifically limited in this embodiment of this application.

The apparatus according to this embodiment of this application can implement all processes implemented by the method embodiments shown in FIG. 2 to FIG. 5, and the same beneficial effects are achieved. Details are not described herein again to avoid repetition.

Optionally, as shown in FIG. 8, an embodiment of this application further provide a communication device 800, including a processor 801, a memory 802, and a program or instructions stored in the memory 802 and runnable on the processor 801. For example, when the communication device 800 is a terminal, when the program or instructions are executed by the processor 801, each process of the foregoing transmission direction determining method embodiment applied to the terminal is implemented, and the same technical effects can be achieved. When the communication device 800 is a network side device, when the program or instructions are executed by the processor 801, each process of the foregoing transmission direction determining method embodiment applied to the network side device is implemented, and the same technical effects can be achieved. Details are not described herein again to avoid repetition.

An embodiment of this application further provides a terminal, including a processor and a communication interface, where the processor is configured to determine a transmission direction corresponding to a time unit based on first indication signaling, where the transmission direction includes an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending.

Figure 9:
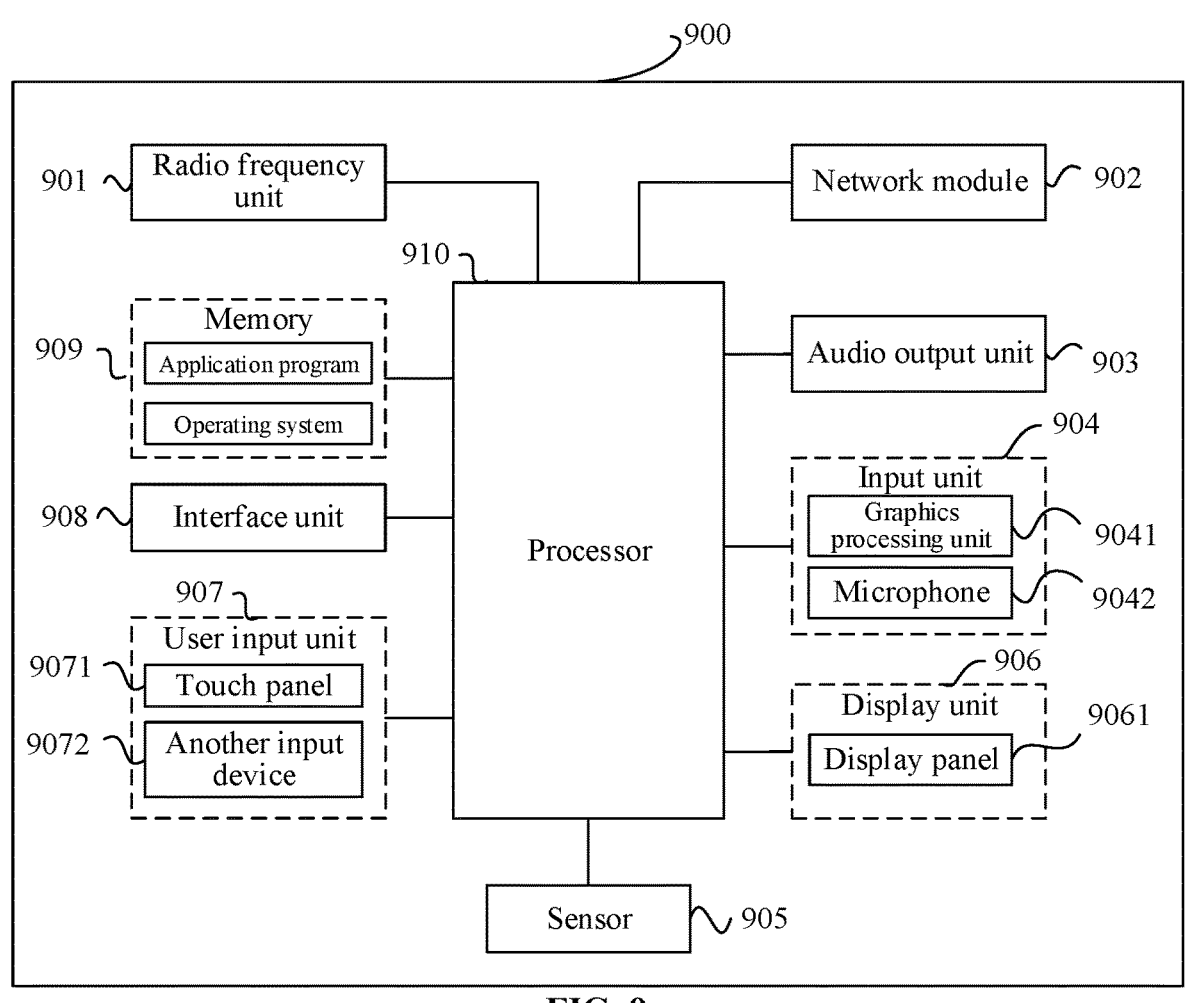
FIG. 9 represents a structural block diagram of a terminal according to an embodiment of this application.

The terminal embodiment corresponds to the foregoing terminal side method embodiment, each implementation process and manner of the foregoing method embodiment is applicable to the terminal embodiment, and the same technical effects can be achieved. Specifically, FIG. 9 is a schematic diagram of a hardware structure of a terminal according to an embodiment of this application. A terminal 900 includes, but is not limited to, at least parts of components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include a power supply (such as a battery) for supplying power to the components. The power supply may be logically connected to the processor 910 by using a power management system, thereby implementing functions such as charging, discharging, and power consumption management by using the power management system. A terminal structure shown in FIG. 9 constitutes no limitation on the terminal, and the terminal may include more or fewer components than those shown in the figure, or some components may be combined, or a different component deployment may be used, which are not described herein again.

It is to be understood that, in this embodiment of this application, the input unit 904 may include a graphics processing unit (GPU) 9041 and a microphone 9042, and the graphics processing unit 9041 processes static pictures or video image data obtained by an image capturing device (such as a camera) in a video capturing mode or an image capturing mode. The display unit 906 may include a display panel 9061, and the display panel 9061 may be configured by using a liquid crystal display, an organic light-emitting diode, or the like. The user input unit 907 includes a touch panel 9071 and another input device 9072. The touch panel 9071 is also referred to as a touch screen. The touch panel 9071 may include two parts: a touch detection apparatus and a touch controller. The another input device 9072 may include, but is not limited to, a physical keyboard, a functional key (such as a volume control key or a switch key), a track ball, a mouse, and a joystick, which are not described herein again.

In this embodiment of this application, the radio frequency unit 901 receives downlink data from a network side device and transmits the downlink data to the processor 910 for processing; and in addition, transmits uplink data to the network side device. Generally, the radio frequency unit 901 includes, but is not limited to, an antenna, at least one amplifier, a transceiver, a coupler, a low noise amplifier, a duplexer, and the like.

The memory 909 may be configured to store a software program or instruction and various data. The memory 909 may mainly include a program or instruction storage area and a data storage area. The program or instruction storage area may store an operating system, an application program or instruction required by at least one function (for example, a sound playback function and an image display function), and the like. In addition, the memory 909 may include a high speed random access memory, and may further include a non-volatile memory, where the non-volatile memory may be a read-only memory (ROM), a programmable ROM (Programmable ROM, PROM), an erasable PROM (Erasable PROM, EPROM), an electrically EPROM (Electrically EPROM, EEPROM), or a flash memory. For example, at least one magnetic disk storage device, a flash memory or another volatile solid-state storage device.

The processor 910 may include one or more processing units. Optionally, the processor 910 may integrate an application processor and a modem processor, where the application processor mainly processes an operating system, a user interface, an application program or instruction, and the like, and the modem processor mainly processes wireless communication, for example, a baseband processor. It may be understood that the foregoing modem processor may also not be integrated into the processor 910.

The processor 910 is configured to determine a transmission direction corresponding to a time unit based on first indication signaling, where the transmission direction includes an uplink transmission direction, a downlink transmission direction, or a flexible transmission direction.

The flexible transmission direction is capable of being indicated as at least one of the following:

an uplink transmission direction;

a downlink transmission direction; and a flexible direction not for receiving and sending.

Optionally, the processor 910 is further configured to determine a transmission direction corresponding to at least one frequency domain unit in the time unit based on the first indication signaling, where the transmission direction corresponding to the frequency domain unit includes an uplink transmission direction, a downlink transmission direction, or a flexible transmission direction; and determine the transmission direction corresponding to the time unit based on the transmission direction corresponding to the frequency domain unit.

Optionally, the first indication signaling includes at least one of the following:

high layer signaling;

radio resource control RRC signaling;

dynamic signaling; and a system message.

Optionally, the system message includes at least one selected from the group of full duplex uplink/downlink common configuration information and flexible duplex uplink/downlink common configuration information.

Optionally, the RRC signaling includes at least one selected from the group of full duplex uplink/downlink dedicated configuration information and flexible duplex uplink/downlink dedicated configuration information.

Optionally, the processor 910 is further configured by the terminal to determine, in a case that the transmission direction corresponding to the frequency domain unit includes at least one of the following, that the transmission direction corresponding to the time unit is the downlink transmission direction:

a downlink transmission direction semi-statically indicated by a system message;

a downlink transmission direction semi-statically indicated by RRC signaling;

downlink transmission indicated by high layer signaling or the RRC signaling;

a downlink transmission direction indicated by dynamic signaling;

a transmission direction corresponding to a synchronization signal and physical broadcast channel signal block SSB position in a system message 1;

a transmission direction corresponding to an SSB position indicated in serving cell configuration common signaling; and a transmission direction corresponding to a control resource set for a first physical downlink control channel PDCCH common search space in a master information block.

Optionally, the processor 910 is further configured by the terminal to determine, in a case that the transmission direction corresponding to the frequency domain unit includes at least one of the following, that the transmission direction corresponding to the time unit is the uplink transmission direction:

an uplink transmission direction semi-statically indicated by a system message;

an uplink transmission direction semi-statically indicated by RRC signaling;

an uplink transmission direction corresponding to uplink transmission indicated by high layer signaling or the RRC signaling; and an uplink transmission direction indicated by dynamic signaling.

Optionally, the processor 910 is further configured by the terminal to determine, in a case that the transmission direction corresponding to the frequency domain unit includes at least one of the following, that the transmission direction corresponding to the time unit is the flexible transmission direction:

a flexible transmission direction semi-statically indicated by a system message;

a flexible transmission direction semi-statically indicated by RRC signaling; and a flexible transmission direction indicated by dynamic signaling.

Optionally, the processor 910 is further configured by the terminal to determine, in a case that the time unit includes at least one first frequency domain unit and a transmission direction corresponding to a second frequency domain unit is a flexible transmission direction, that the transmission direction corresponding to the time unit is the downlink transmission direction, where the first frequency domain unit is a frequency domain unit whose corresponding transmission direction is determined as the downlink transmission direction based on the first indication signaling, and the second frequency domain unit is a frequency domain unit other than the first frequency domain unit in the time unit.

Optionally, the processor 910 is further configured by the terminal to determine, in a case that the time unit includes at least one third frequency domain unit and a transmission direction corresponding to a fourth frequency domain unit is a flexible transmission direction, that the transmission direction corresponding to the time unit is the uplink transmission direction, where the third frequency domain unit is a frequency domain unit whose corresponding transmission direction is determined as the uplink transmission direction based on the first indication signaling, and the fourth frequency domain unit is a frequency domain unit other than the third frequency domain unit in the time unit.

Optionally, the processor 910 is further configured by the terminal to determine, in a case that transmission directions of any two frequency domain units in the time unit are determined as a first preset transmission direction combination based on the first indication signaling, the transmission direction corresponding to the time unit based on a preset rule, where the preset rule includes at least one of the following:

determining the transmission direction corresponding to the time unit based on a transmission direction corresponding to a frequency domain unit having a minimum index in the time unit;

determining the transmission direction corresponding to the time unit based on a transmission direction corresponding to a reference frequency domain unit in the time unit;

determining the transmission direction corresponding to the time unit based on a relationship among a first value, a second value, and a third value, where the first value is a quantity of frequency domain units whose corresponding transmission directions are uplink transmission directions in the time unit, the second value is a quantity of frequency domain units whose corresponding transmission directions are downlink transmission directions in the time unit, and the third value is a quantity of frequency domain units whose corresponding transmission directions are flexible transmission directions in the time unit;

determining as a preset transmission direction by default, where the preset transmission direction includes the uplink transmission direction, the downlink transmission direction, or the flexible transmission direction;

determining as an error network configuration;

determining, by the terminal, the transmission direction corresponding to the time unit;

determining the transmission direction corresponding to the time unit based on dynamic signaling on a target carrier;

determining the transmission direction corresponding to the time unit based on dynamic signaling on an activated bandwidth part BWP on a target carrier;

determining the transmission direction corresponding to the time unit based on target information of a to-be-processed signal on a target carrier; and determining the transmission direction corresponding to the time unit based on target information of a to-be-processed signal on an activated BWP on a target carrier, where the target information includes at least one selected from the group of a signal priority, signal content, a channel on which a signal is located, and a signal size; and the target carrier is all carriers in the time unit or a first carrier in the time unit.

Optionally, the first carrier includes at least one of the following:

a carrier having a maximum or minimum index in all active carriers;

a reference carrier configured or indicated by a network; and a carrier that has a maximum or minimum index in a first carrier set of the time unit and has an uplink or downlink transmission direction, where the first carrier set is a set of active carriers other than active carriers whose transmission directions are flexible transmission directions in the time unit.

Optionally, the first preset transmission direction combination includes at least one of the following:

a downlink transmission direction and an uplink transmission direction;

a semi-statically indicated downlink transmission direction and a dynamically indicated flexible transmission direction;

a semi-statically indicated uplink transmission direction and a dynamically indicated flexible transmission direction;

a transmission direction corresponding to an SSB position in a system message 1 and a dynamically indicated flexible transmission direction;

a transmission direction corresponding to an SSB position indicated in serving cell configuration common signaling and a dynamically indicated flexible transmission direction; and a transmission direction corresponding to a control resource set for a first PDCCH common search space in a master information block and a dynamically indicated flexible transmission direction.

Optionally, the processor 910 is further configured to perform the following operations:

determining, in a case that transmission directions of any two frequency domain units in the time unit are determined as a second preset transmission direction combination based on the first indication signaling, that the transmission direction corresponding to the time unit is the uplink transmission direction;

in a case that transmission directions of any two frequency domain units in the time unit are determined as a third preset transmission direction combination based on the first indication signaling, determining that the transmission direction corresponding to the time unit is the downlink transmission direction or the flexible transmission direction if a time difference between a first symbol and a second symbol is greater than or equal to processing time of the terminal; if the time difference between the first symbol and the second symbol is less than the processing time of the terminal, determining that the transmission direction corresponding to the time unit is the uplink transmission direction or determining as an error network configuration; and determining, in a case that transmission directions of any two frequency domain units in the time unit are determined as a third preset transmission direction combination based on the first indication signaling, that the transmission direction corresponding to the time unit is the downlink transmission direction or the flexible transmission direction, where a time difference between a first symbol and a second symbol that are configured by a network is greater than or equal to processing time of the terminal, where the second preset transmission direction combination includes at least one of the following:

a semi-statically indicated downlink transmission direction, and an uplink transmission direction or a flexible transmission direction that is dynamically indicated; and a downlink transmission direction corresponding to downlink transmission indicated by high layer signaling or RRC signaling, and an uplink transmission direction or a flexible transmission direction that is dynamically indicated;

the third preset transmission direction combination includes at least one of the following:

a semi-statically indicated uplink transmission direction, and a downlink transmission direction or a flexible transmission direction that is dynamically indicated; and an uplink transmission direction corresponding to uplink transmission indicated by high layer signaling or RRC signaling, and a downlink transmission direction or a flexible transmission direction that is dynamically indicated; and the first symbol is a start symbol of uplink transmission of a first frequency domain unit in the any two frequency domain units, and the second symbol is a last symbol of downlink transmission or flexible transmission of a second frequency domain unit in the any two frequency domain units.

Optionally, the processor 910 is further configured by the terminal to determine, in a case that a transmission direction corresponding to any frequency domain unit in the time unit is at least one of the following, that the transmission direction corresponding to the time unit is the downlink transmission direction, and perform a corresponding downlink action:

a transmission direction corresponding to an SSB transmission occasion indicated by an SSB position;

a transmission direction corresponding to transmission time indicated by an SSB measurement timing configuration;

a transmission direction corresponding to a downlink measurement reference signal;

a transmission direction corresponding to a valid tracking reference signal; and a transmission direction corresponding to a control resource set for a first physical downlink control channel PDCCH common search space.

The terminal of this embodiment of this application determines a transmission direction, for example, an uplink transmission direction, a downlink transmission direction, or a flexible transmission direction, corresponding to a time unit based on first indication signaling, so that a terminal without a full duplex capability is enabled to determine a transmission direction of a time unit in a flexible/full duplex system.

Figure 10:
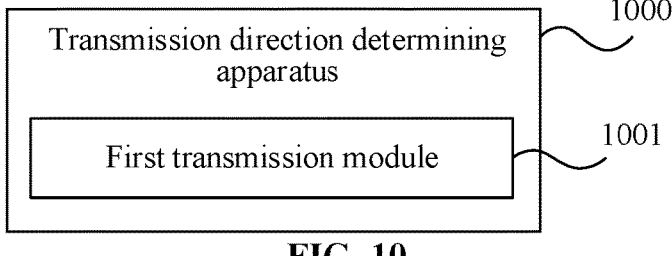
FIG. 10 represents a second schematic diagram of a module of a transmission direction determining apparatus according to an embodiment of this application.

As shown in FIG. 10, an embodiment of this application further provides a transmission direction determining apparatus 1000, including:

a first transmission module 1001, configured to send first indication signaling, where the first indication signaling is for determining a transmission direction corresponding to a time unit, where the transmission direction includes an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending.

Optionally, the apparatus of this embodiment of this application further includes:

a second determining module, configured to determine the first indication signaling.

Optionally, the first indication signaling includes at least one of the following:

high layer signaling;

radio resource control RRC signaling;

dynamic signaling; and a system message.

Optionally, the system message includes at least one selected from the group of full duplex uplink/downlink common configuration information and flexible duplex uplink/downlink common configuration information.

Optionally, the RRC signaling includes at least one selected from the group of full duplex uplink/downlink dedicated configuration information and flexible duplex uplink/downlink dedicated configuration information.

The apparatus of this embodiment of this application sends first indication signaling, where the first indication signaling is for determining a transmission direction corresponding to a time unit, so that a terminal without a full duplex capability is enabled to determine a transmission direction of a time unit in a flexible/full duplex system.

An embodiment of this application further provides a network side device, including a processor and a communication interface, where the communication interface is configured to send first indication signaling, where the first indication signaling is for determining a transmission direction corresponding to a time unit, where the transmission direction includes an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending.

The network side device embodiment corresponds to the foregoing network side device method embodiment, each implementation process and manner of the foregoing method embodiment is applicable to the network side device embodiment, and the same technical effects can be achieved.

Figure 11:
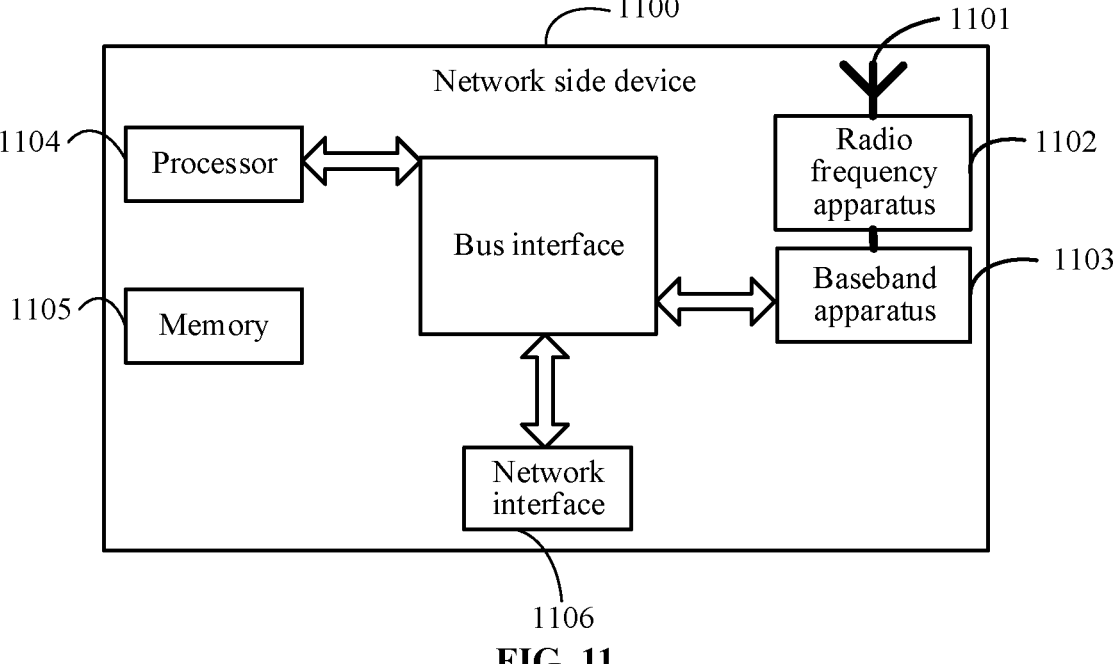
FIG. 11 represents a structural block diagram of a network side device according to an embodiment of this application.

Specifically, an embodiment of this application further provides a network side device. As shown in FIG. 11, a network side device 1100 includes: an antenna 1101, a radio frequency apparatus 1102, and a baseband apparatus 1103. The antenna 1101 is connected to the radio frequency apparatus 1102. In an uplink direction, the radio frequency apparatus 1102 receives information through the antenna 1101 and sends the received information to the baseband apparatus 1103 for processing. In a downlink direction, the baseband apparatus 1103 processes the information to be sent and sends the processed information to the radio frequency apparatus 1102. The radio frequency apparatus 1102 processes the received information and sends the processed received information out through the antenna 1101.

The foregoing radio frequency apparatus may be located in the baseband apparatus 1103, and the method executed by the network side device in the above embodiments may be implemented in the baseband apparatus 1103, where the baseband apparatus 1103 includes a processor 1104 and a memory 1105.

The baseband apparatus 1103 may include, for example, at least one baseband board, where a plurality of chips are disposed on the baseband board. As shown in FIG. 11, one of the chips is, for example, the processor 1104, connected with the memory 1105 to invoke a program in the memory 1105 to perform network side device operations shown in the above method embodiments.

The baseband apparatus 1103 may further include a network interface 1106, configured to interact information with the radio frequency apparatus 1102, and the network interface is, for example, a common public radio interface (CPRI).

Specifically, the network side device of this embodiment of this application further includes: instructions or a program stored in the memory 1105 and runnable on the processor 1104, and the processor 1104 invokes the instructions or the program in the memory 1105 to perform the method performed by the modules shown in FIG. 10, and the same technical effects can be achieved. Details are not described herein to avoid repetition.

An embodiment of this application further provides a readable storage medium, storing a program or instructions, where when the program or instructions are executed by a processor, each process of the foregoing transmission direction determining method embodiments is implemented and the same technical effects can be achieved. Details are not described herein again to avoid repetition.

The processor is the processor in the terminal described in the above embodiment. The readable storage medium includes a computer-readable storage medium, such as, a read-only memory (ROM), a random access memory (RAM), a magnetic disk, or an optical disk.

An embodiment of this application additionally provides a chip, including a processor and a communication interface, where the communication interface is coupled to the processor, and the processor is configured to run a program or instructions to implement each process of the foregoing transmission direction determining method embodiments and the same technical effects can be achieved. Details are not described herein again to avoid repetition.

It is to be understood that the chip mentioned in this embodiment of this application may also be referred to as a system-level chip, a system chip, a chip system, an SoC chip, or the like.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

Through the description of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be implemented in a form of a computer software product. The computer software product is stored in a storage medium (such as a ROM/ RAM, a magnetic disk, or an optical disk) and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the foregoing specific embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. A transmission direction determining method, comprising:

determining, by a terminal, a transmission direction corresponding to a time unit based on first indication signaling, wherein the transmission direction comprises an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending;

wherein the determining, by a terminal, a transmission direction corresponding to a time unit based on first indication signaling comprises:

determining, by the terminal, transmission directions corresponding to multiple frequency domain units in the time unit based on the first indication signaling, wherein the transmission direction comprises an uplink transmission direction, a downlink transmission direction, or a flexible transmission direction; and determining, by the terminal, the transmission direction corresponding to the time unit based on the transmission direction corresponding to the frequency domain units.

2. The method according to claim 1, wherein the first indication signaling comprises at least one of the following:

high layer signaling;

radio resource control RRC signaling;

dynamic signaling; and a system message.

3. The method according to claim 2, wherein the system message comprises at least one selected from the group of full duplex uplink/downlink common configuration information and flexible duplex uplink/downlink common configuration information;

or, wherein the RRC signaling comprises at least one selected from the group of full duplex uplink/downlink dedicated configuration information and flexible duplex uplink/downlink dedicated configuration information.

4. The method according to claim 1, wherein the determining, by the terminal, the transmission direction corresponding to the time unit based on the transmission directions corresponding to the frequency domain units comprises:

determining, by the terminal in a case that the transmission directions corresponding to the frequency domain units comprise at least one of the following, that the transmission direction corresponding to the time unit is the downlink transmission direction:

a downlink transmission direction semi-statically indicated by a system message;

a downlink transmission direction semi-statically indicated by RRC signaling;

a downlink transmission direction corresponding to downlink transmission indicated by high layer signaling or the RRC signaling;

a downlink transmission direction indicated by dynamic signaling;

a transmission direction corresponding to a synchronization signal and physical broadcast channel signal block SSB position in a system message 1;

a transmission direction corresponding to an SSB position indicated in serving cell configuration common signaling; and a transmission direction corresponding to a control resource set for a first physical downlink control channel PDCCH common search space in a master information block;

or, wherein the determining, by the terminal, the transmission direction corresponding to the time unit based on the transmission directions corresponding to the frequency domain units comprises:

determining, by the terminal in a case that the transmission directions corresponding to the frequency domain units comprise at least one of the following, that the transmission direction corresponding to the time unit is the uplink transmission direction:

an uplink transmission direction semi-statically indicated by a system message;

an uplink transmission direction semi-statically indicated by RRC signaling;

an uplink transmission direction corresponding to uplink transmission indicated by high layer signaling or the RRC signaling; and an uplink transmission direction indicated by dynamic signaling;

or, wherein the determining, by the terminal, the transmission direction corresponding to the time unit based on the transmission directions corresponding to the frequency domain units comprises:

determining, by the terminal in a case that the transmission directions corresponding to the frequency domain units comprise at least one of the following, that the transmission direction corresponding to the time unit is the flexible transmission direction:

a flexible transmission direction semi-statically indicated by a system message;

a flexible transmission direction semi-statically indicated by RRC signaling; and a flexible transmission direction indicated by dynamic signaling;

or, wherein the determining, by the terminal, the transmission direction corresponding to the time unit based on the transmission directions corresponding to the frequency domain units comprises:

determining, by the terminal in a case that the time unit comprises at least one first frequency domain unit and a transmission direction corresponding to a second frequency domain unit is a flexible transmission direction, that the transmission direction corresponding to the time unit is the downlink transmission direction, wherein the first frequency domain unit is a frequency domain unit whose corresponding transmission direction is determined as the downlink transmission direction based on the first indication signaling, and the second frequency domain unit is a frequency domain unit other than the first frequency domain unit in the time unit;

or, wherein the determining, by the terminal, the transmission direction corresponding to the time unit based on the transmission directions corresponding to the frequency domain units comprises:

determining, by the terminal in a case that the time unit comprises at least one third frequency domain unit and a transmission direction corresponding to a fourth frequency domain unit is a flexible transmission direction, that the transmission direction corresponding to the time unit is the uplink transmission direction, wherein the third frequency domain unit is a frequency domain unit whose corresponding transmission direction is determined as the uplink transmission direction based on the first indication signaling, and the fourth frequency domain unit is a frequency domain unit other than the third frequency domain unit in the time unit;

or, wherein the determining, by the terminal, the transmission direction corresponding to the time unit based on the transmission directions corresponding to the frequency domain units comprises:

determining, by the terminal in a case that transmission directions of any two frequency domain units in the time unit are determined as a first preset transmission direction combination based on the first indication signaling, the transmission direction corresponding to the time unit based on a preset rule, wherein the preset rule comprises at least one of the following:

determining the transmission direction corresponding to the time unit based on a transmission direction corresponding to a frequency domain unit having a minimum index in the time unit;

determining the transmission direction corresponding to the time unit based on a transmission direction corresponding to a reference frequency domain unit in the time unit;

determining the transmission direction corresponding to the time unit based on a relationship among a first value, a second value, and a third value, wherein the first value is a quantity of frequency domain units whose corresponding transmission directions are uplink transmission directions in the time unit, the second value is a quantity of frequency domain units whose corresponding transmission directions are downlink transmission directions in the time unit, and the third value is a quantity of frequency domain units whose corresponding transmission directions are flexible transmission directions in the time unit;

determining as a preset transmission direction by default, wherein the preset transmission direction comprises the uplink transmission direction, the downlink transmission direction, or the flexible transmission direction;

determining as an error network configuration;

determining, by the terminal, the transmission direction corresponding to the time unit;

determining the transmission direction corresponding to the time unit based on dynamic signaling on a target carrier;

determining the transmission direction corresponding to the time unit based on dynamic signaling on an activated bandwidth part BWP on a target carrier;

determining the transmission direction corresponding to the time unit based on target information of a to-be-processed signal on a target carrier; and determining the transmission direction corresponding to the time unit based on target information of a to-be-processed signal on an activated BWP on a target carrier, wherein the target information comprises at least one selected from the group of a signal priority, signal content, a channel on which a signal is located, and a signal size; and the target carrier is all carriers in the time unit or a first carrier in the time unit.

5. The method according to claim 4, wherein the first carrier comprises at least one of the following:

a carrier having a maximum or minimum index in all active carriers;

a reference carrier configured or indicated by a network; and a carrier that has a maximum or minimum index in a first carrier set of the time unit and has an uplink or downlink transmission direction, wherein the first carrier set is a set of active carriers other than active carriers whose transmission directions are flexible transmission directions in the time unit;

or, wherein the first preset transmission direction combination comprises at least one of the following:

a downlink transmission direction and an uplink transmission direction;

a semi-statically indicated downlink transmission direction and a dynamically indicated flexible transmission direction;

a semi-statically indicated uplink transmission direction and a dynamically indicated flexible transmission direction;

a transmission direction corresponding to an SSB position in a system message 1 and a dynamically indicated flexible transmission direction;

a transmission direction corresponding to an SSB position indicated in serving cell configuration common signaling and a dynamically indicated flexible transmission direction; and a transmission direction corresponding to a control resource set for a first PDCCH common search space in a master information block and a dynamically indicated flexible transmission direction.

6. The method according to claim 1, wherein the determining, by the terminal, the transmission direction corresponding to the time unit based on the transmission directions corresponding to the frequency domain units comprises at least one of the following:

determining, in a case that transmission directions of any two frequency domain units in the time unit are determined as a second preset transmission direction combination based on the first indication signaling, that the transmission direction corresponding to the time unit is the uplink transmission direction;

in a case that transmission directions of any two frequency domain units in the time unit are determined as a third preset transmission direction combination based on the first indication signaling, determining that the transmission direction corresponding to the time unit is the downlink transmission direction or the flexible transmission direction if a time difference between a first symbol and a second symbol is greater than or equal to processing time of the terminal; if the time difference between the first symbol and the second symbol is less than the processing time of the terminal, determining that the transmission direction corresponding to the time unit is the uplink transmission direction or determining as an error network configuration; and determining, in a case that transmission directions of any two frequency domain units in the time unit are determined as a third preset transmission direction combination based on the first indication signaling, that the transmission direction corresponding to the time unit is the downlink transmission direction or the flexible transmission direction, wherein a time difference between a first symbol and a second symbol that are configured by a network is greater than or equal to processing time of the terminal, wherein the second preset transmission direction combination comprises at least one of the following:

a semi-statically indicated downlink transmission direction, and an uplink transmission direction or a flexible transmission direction that is dynamically indicated; and a downlink transmission direction corresponding to downlink transmission indicated by high layer signaling or RRC signaling, and an uplink transmission direction or a flexible transmission direction that is dynamically indicated;

the third preset transmission direction combination comprises at least one of the following:

a semi-statically indicated uplink transmission direction, and a downlink transmission direction or a flexible transmission direction that is dynamically indicated; and an uplink transmission direction corresponding to uplink transmission indicated by high layer signaling or RRC signaling, and a downlink transmission direction or a flexible transmission direction that is dynamically indicated; and the first symbol is a start symbol of uplink transmission of a first frequency domain unit in the any two frequency domain units, and the second symbol is a last symbol of downlink transmission or flexible transmission of a second frequency domain unit in the any two frequency domain units;

or, wherein the determining, by the terminal, the transmission direction corresponding to the time unit based on the transmission directions corresponding to the frequency domain units comprises:

determining, by the terminal in a case that a transmission direction corresponding to any frequency domain unit in the time unit is at least one of the following, that the transmission direction corresponding to the time unit is the downlink transmission direction, and performing a corresponding downlink action:

a transmission direction corresponding to an SSB transmission occasion indicated by an SSB position;

a transmission direction corresponding to transmission time indicated by an SSB measurement timing configuration;

a transmission direction corresponding to a downlink measurement reference signal;

a transmission direction corresponding to a valid tracking reference signal; and a transmission direction corresponding to a control resource set for a first physical downlink control channel PDCCH common search space.

7. A transmission direction determining method, comprising:

sending, by a network side device, first indication signaling, wherein the first indication signaling is for determining a transmission direction corresponding to a time unit, wherein the transmission direction comprises an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending;

wherein the determining a transmission direction corresponding to a time unit comprises:

determining transmission directions corresponding to multiple frequency domain units in the time unit respectively based on the first indication signaling, wherein the transmission direction comprises an uplink transmission direction, a downlink transmission direction, or a flexible transmission direction; and determining the transmission direction corresponding to the time unit based on the transmission directions corresponding to the frequency domain units.

8. The method according to claim 7, wherein the first indication signaling comprises at least one of the following:

high layer signaling;

radio resource control RRC signaling;

dynamic signaling; and a system message.

9. The method according to claim 8, wherein the system message comprises at least one selected from the group of full duplex uplink/downlink common configuration information and flexible duplex uplink/downlink common configuration information;

or, wherein the RRC signaling comprises at least one selected from the group of full duplex uplink/downlink dedicated configuration information and flexible duplex uplink/downlink dedicated configuration information.

10. A terminal, comprising a processor, a memory, and a program or instructions that are stored on the memory and are runnable on the processor, wherein when the program or the instructions are executed by the processor, following steps are implemented:

determining a transmission direction corresponding to a time unit based on first indication signaling, wherein the transmission direction comprises an uplink transmission direction, a downlink transmission direction, or a flexible transmission direction; and the flexible transmission direction is capable of being indicated as at least one of the following:

an uplink transmission direction;

a downlink transmission direction; and a flexible direction not for receiving and sending;

wherein the determining a transmission direction corresponding to a time unit based on first indication signaling comprises:

determining a transmission direction corresponding to multiple frequency domain units in the time unit based on the first indication signaling, wherein the transmission direction comprises an uplink transmission direction, a downlink transmission direction, or a flexible transmission direction; and determining the transmission direction corresponding to the time unit based on the transmission direction corresponding to the frequency domain units.

11. The terminal according to claim 10, wherein the first indication signaling comprises at least one of the following:

high layer signaling;

radio resource control RRC signaling;

dynamic signaling; and a system message.

12. The terminal according to claim 11, wherein the system message comprises at least one selected from the group of full duplex uplink/downlink common configuration information and flexible duplex uplink/downlink common configuration information;

or, wherein the RRC signaling comprises at least one selected from the group of full duplex uplink/downlink dedicated configuration information and flexible duplex uplink/downlink dedicated configuration information.

13. The terminal according to claim 10, wherein the determining the transmission direction corresponding to the time unit based on the transmission directions corresponding to the frequency domain units comprises:

determining, in a case that the transmission directions corresponding to the frequency domain units comprise at least one of the following, that the transmission direction corresponding to the time unit is the downlink transmission direction:

a downlink transmission direction semi-statically indicated by a system message;

a downlink transmission direction semi-statically indicated by RRC signaling;

a downlink transmission direction corresponding to downlink transmission indicated by high layer signaling or the RRC signaling;

a downlink transmission direction indicated by dynamic signaling;

a transmission direction corresponding to a synchronization signal and physical broadcast channel signal block SSB position in a system message 1;

a transmission direction corresponding to an SSB position indicated in serving cell configuration common signaling; and a transmission direction corresponding to a control resource set for a first physical downlink control channel PDCCH common search space in a master information block;

or, wherein the determining the transmission direction corresponding to the time unit based on the transmission directions corresponding to the frequency domain units comprises:

determining, in a case that the transmission directions corresponding to the frequency domain units comprise at least one of the following, that the transmission direction corresponding to the time unit is the uplink transmission direction:

an uplink transmission direction semi-statically indicated by a system message;

an uplink transmission direction semi-statically indicated by RRC signaling;

an uplink transmission direction corresponding to uplink transmission indicated by high layer signaling or the RRC signaling; and an uplink transmission direction indicated by dynamic signaling;

or, wherein the determining the transmission direction corresponding to the time unit based on the transmission directions corresponding to the frequency domain units comprises:

determining, in a case that the transmission directions corresponding to the frequency domain units comprise at least one of the following, that the transmission direction corresponding to the time unit is the flexible transmission direction:

a flexible transmission direction semi-statically indicated by a system message;

a flexible transmission direction semi-statically indicated by RRC signaling; and a flexible transmission direction indicated by dynamic signaling;

or, p1 wherein the determining the transmission direction corresponding to the time unit based on the transmission directions corresponding to the frequency domain units comprises:

determining, in a case that the time unit comprises at least one first frequency domain unit and a transmission direction corresponding to a second frequency domain unit is a flexible transmission direction, that the transmission direction corresponding to the time unit is the downlink transmission direction, wherein the first frequency domain unit is a frequency domain unit whose corresponding transmission direction is determined as the downlink transmission direction based on the first indication signaling, and the second frequency domain unit is a frequency domain unit other than the first frequency domain unit in the time unit;

or, wherein the determining the transmission direction corresponding to the time unit based on the transmission directions corresponding to the frequency domain units comprises:

determining, in a case that the time unit comprises at least one third frequency domain unit and a transmission direction corresponding to a fourth frequency domain unit is a flexible transmission direction, that the transmission direction corresponding to the time unit is the uplink transmission direction, wherein the third frequency domain unit is a frequency domain unit whose corresponding transmission direction is determined as the uplink transmission direction based on the first indication signaling, and the fourth frequency domain unit is a frequency domain unit other than the third frequency domain unit in the time unit;

or, wherein the determining the transmission direction corresponding to the time unit based on the transmission directions corresponding to the frequency domain units comprises:

determining, in a case that transmission directions of any two frequency domain units in the time unit are determined as a first preset transmission direction combination based on the first indication signaling, the transmission direction corresponding to the time unit based on a preset rule, wherein the preset rule comprises at least one of the following:

determining the transmission direction corresponding to the time unit based on a transmission direction corresponding to a frequency domain unit having a minimum index in the time unit;

determining the transmission direction corresponding to the time unit based on a transmission direction corresponding to a reference frequency domain unit in the time unit;

determining the transmission direction corresponding to the time unit based on a relationship among a first value, a second value, and a third value, wherein the first value is a quantity of frequency domain units whose corresponding transmission directions are uplink transmission directions in the time unit, the second value is a quantity of frequency domain units whose corresponding transmission directions are downlink transmission directions in the time unit, and the third value is a quantity of frequency domain units whose corresponding transmission directions are flexible transmission directions in the time unit;

determining as a preset transmission direction by default, wherein the preset transmission direction comprises the uplink transmission direction, the downlink transmission direction, or the flexible transmission direction;

determining as an error network configuration;

determining, by the terminal, the transmission direction corresponding to the time unit;

determining the transmission direction corresponding to the time unit based on dynamic signaling on a target carrier;

determining the transmission direction corresponding to the time unit based on dynamic signaling on an activated bandwidth part BWP on a target carrier;

determining the transmission direction corresponding to the time unit based on target information of a to-be-processed signal on a target carrier; and determining the transmission direction corresponding to the time unit based on target information of a to-be-processed signal on an activated BWP on a target carrier, wherein the target information comprises at least one selected from the group of a signal priority, signal content, a channel on which a signal is located, and a signal size; and the target carrier is all carriers in the time unit or a first carrier in the time unit.

14. The terminal according to claim 13, wherein the first carrier comprises at least one of the following:

a carrier having a maximum or minimum index in all active carriers;

a reference carrier configured or indicated by a network; and a carrier that has a maximum or minimum index in a first carrier set of the time unit and has an uplink or downlink transmission direction, wherein the first carrier set is a set of active carriers other than active carriers whose transmission directions are flexible transmission directions in the time unit;

or, wherein the first preset transmission direction combination comprises at least one of the following:

a downlink transmission direction and an uplink transmission direction;

a semi-statically indicated downlink transmission direction and a dynamically indicated flexible transmission direction;

a semi-statically indicated uplink transmission direction and a dynamically indicated flexible transmission direction;

a transmission direction corresponding to an SSB position in a system message 1 and a dynamically indicated flexible transmission direction;

a transmission direction corresponding to an SSB position indicated in serving cell configuration common signaling and a dynamically indicated flexible transmission direction; and a transmission direction corresponding to a control resource set for a first PDCCH common search space in a master information block and a dynamically indicated flexible transmission direction.

15. The terminal according to claim 10, wherein the determining the transmission direction corresponding to the time unit based on the transmission directions corresponding to the frequency domain units comprises at least one of the following:

determining, in a case that transmission directions of any two frequency domain units in the time unit are determined as a second preset transmission direction combination based on the first indication signaling, that the transmission direction corresponding to the time unit is the uplink transmission direction;

in a case that transmission directions of any two frequency domain units in the time unit are determined as a third preset transmission direction combination based on the first indication signaling, determining that the transmission direction corresponding to the time unit is the downlink transmission direction or the flexible transmission direction if a time difference between a first symbol and a second symbol is greater than or equal to processing time of the terminal; if the time difference between the first symbol and the second symbol is less than the processing time of the terminal, determining that the transmission direction corresponding to the time unit is the uplink transmission direction or determining as an error network configuration; and determining, in a case that transmission directions of any two frequency domain units in the time unit are determined as a third preset transmission direction combination based on the first indication signaling, that the transmission direction corresponding to the time unit is the downlink transmission direction or the flexible transmission direction, wherein a time difference between a first symbol and a second symbol that are configured by a network is greater than or equal to processing time of the terminal, wherein the second preset transmission direction combination comprises at least one of the following:

a semi-statically indicated downlink transmission direction, and an uplink transmission direction or a flexible transmission direction that is dynamically indicated; and a downlink transmission direction corresponding to downlink transmission indicated by high layer signaling or RRC signaling, and an uplink transmission direction or a flexible transmission direction that is dynamically indicated;

the third preset transmission direction combination comprises at least one of the following:

a semi-statically indicated uplink transmission direction, and a downlink transmission direction or a flexible transmission direction that is dynamically indicated; and an uplink transmission direction corresponding to uplink transmission indicated by high layer signaling or RRC signaling, and a downlink transmission direction or a flexible transmission direction that is dynamically indicated; and the first symbol is a start symbol of uplink transmission of a first frequency domain unit in the any two frequency domain units, and the second symbol is a last symbol of downlink transmission or flexible transmission of a second frequency domain unit in the any two frequency domain units;

or, wherein the determining the transmission direction corresponding to the time unit based on the transmission directions corresponding to the frequency domain units comprises:

determining, in a case that a transmission direction corresponding to any frequency domain unit in the time unit is at least one of the following, that the transmission direction corresponding to the time unit is the downlink transmission direction, and performing a corresponding downlink action:

a transmission direction corresponding to an SSB transmission occasion indicated by an SSB position;

a transmission direction corresponding to transmission time indicated by an SSB measurement timing configuration;

a transmission direction corresponding to a downlink measurement reference signal;

a transmission direction corresponding to a valid tracking reference signal; and a transmission direction corresponding to a control resource set for a first physical downlink control channel PDCCH common search space.

16. A network side device, comprising a processor, a memory, and a program or instructions that are stored on the memory and are runnable on the processor, wherein when the program or the instructions are executed by the processor, the steps of the transmission direction determining method according to claim 7 are implemented.

17. The network side device according to claim 16, wherein the first indication signaling comprises at least one of the following:

high layer signaling;

radio resource control RRC signaling;

dynamic signaling; and a system message.

18. The network side device according to claim 17, wherein the system message comprises at least one selected from the group of full duplex uplink/downlink common configuration information and flexible duplex uplink/downlink common configuration information;

or, wherein the RRC signaling comprises at least one selected from the group of full duplex uplink/downlink dedicated configuration information and flexible duplex uplink/downlink dedicated configuration information.

* * * * *